United States Patent
Panchaksharaiah et al.

(10) Patent No.: US 11,729,480 B2
(45) Date of Patent: Aug. 15, 2023

(54) SYSTEMS AND METHODS TO ENHANCE INTERACTIVE PROGRAM WATCHING

(71) Applicant: Rovi Guides, Inc., San Jose, CA (US)

(72) Inventors: Vishwas Sharadanagar Panchaksharaiah, Tiptur (IN); Poovarasan Chitravel, Tamilnadu (IN); Pawan Nagdeve, Bangalore (IN); Gudimetla Baby, Andhra Pradesh (IN); Sambeet Burma, Bangalore (IN); Gyanveer Singh, Vaishali Bihar (IN); Cato Yang, San Jose, CA (US)

(73) Assignee: ROVI GUIDES, INC., San Jose, CA (US)

( * ) Notice: Subject to any disclaimer, the term of this patent is extended or adjusted under 35 U.S.C. 154(b) by 0 days.

(21) Appl. No.: 17/458,763

(22) Filed: Aug. 27, 2021

(65) Prior Publication Data
US 2023/0062650 A1    Mar. 2, 2023

(51) Int. Cl.
*H04N 21/85* (2011.01)
*H04N 21/8549* (2011.01)
*H04N 21/475* (2011.01)
*H04N 21/45* (2011.01)
*H04N 21/8545* (2011.01)
*H04N 21/47* (2011.01)

(52) U.S. Cl.
CPC ..... *H04N 21/8549* (2013.01); *H04N 21/4532* (2013.01); *H04N 21/4755* (2013.01); *H04N 21/8545* (2013.01)

(58) Field of Classification Search
USPC .............................................. 386/241, 248
See application file for complete search history.

(56) References Cited

U.S. PATENT DOCUMENTS

| | | | |
|---|---|---|---|
| 6,993,789 B1 * | 1/2006 | Sezan | H04N 21/4828 725/142 |
| 7,315,826 B1 * | 1/2008 | Guheen | G06Q 30/0201 705/7.29 |
| 8,437,606 B2 * | 5/2013 | Chun | G11B 27/34 386/332 |
| 9,071,814 B1 * | 6/2015 | Fan | H04N 19/177 |
| 9,082,092 B1 | 7/2015 | Henry | |
| 9,286,938 B1 * | 3/2016 | Tseytlin | G11B 27/031 |
| 10,083,360 B1 * | 9/2018 | Woolley | G06V 20/47 |
| 10,088,983 B1 | 10/2018 | Qaddoura et al. | |
| 10,237,599 B1 * | 3/2019 | Gravino | H04N 21/6118 |

(Continued)

OTHER PUBLICATIONS

U.S. Appl. No. 17/458,759, filed Aug. 27, 2021, Vishwas Sharadanagar Panchaksharaiah.

*Primary Examiner* — Nigar Chowdhury
(74) *Attorney, Agent, or Firm* — Haley Guiliano LLP

(57) ABSTRACT

Systems and methods are provided for providing an enhanced viewing experience for one or more users of an interactive media program. One example method includes receiving, at a computing device, the interactive media program, wherein the interactive media program comprises a plurality of alternative segments followed by a common segment. A selection of a first alternative segment is received and is generated for output. A summary of at least one segment from the plurality of alternative segments is generated, and the summary is generated for output. The common segment of the interactive media program is generated for output.

18 Claims, 24 Drawing Sheets

(56) References Cited

U.S. PATENT DOCUMENTS

| | | | |
|---|---|---|---|
| 10,455,297 B1* | 10/2019 | Mahyar | H04N 21/4532 |
| 10,491,947 B1 | 11/2019 | Weisman et al. | |
| 10,855,952 B1* | 12/2020 | Rocklin | H04L 65/1089 |
| 10,977,258 B1* | 4/2021 | Liu | H04W 12/08 |
| 11,044,301 B2* | 6/2021 | Gallagher | H04L 65/403 |
| 11,050,809 B2* | 6/2021 | Vishnia | H04L 65/612 |
| 11,334,618 B1* | 5/2022 | Adlersberg | G06F 3/162 |
| 2002/0120931 A1 | 8/2002 | Huber et al. | |
| 2006/0064733 A1 | 3/2006 | Norton et al. | |
| 2007/0157249 A1* | 7/2007 | Cordray | H04N 5/782 348/E7.071 |
| 2007/0245403 A1* | 10/2007 | Ginter | H04N 21/235 726/2 |
| 2008/0066111 A1* | 3/2008 | Ellis | G06F 3/0481 725/57 |
| 2009/0208180 A1* | 8/2009 | Ashby | H04N 21/84 386/353 |
| 2010/0023964 A1* | 1/2010 | Basso | H04N 21/235 725/32 |
| 2012/0210203 A1* | 8/2012 | Kandekar | G06F 16/345 715/230 |
| 2012/0311633 A1 | 12/2012 | Mandrekar et al. | |
| 2013/0167168 A1* | 6/2013 | Ellis | H04N 5/50 725/12 |
| 2014/0237501 A1* | 8/2014 | Berrier | H04N 21/4542 725/25 |
| 2014/0298378 A1* | 10/2014 | Kelley | H04N 21/8133 725/32 |
| 2015/0074047 A1* | 3/2015 | Gardes | G06F 21/10 707/610 |
| 2015/0082349 A1* | 3/2015 | Ishtiaq | H04N 21/4316 725/40 |
| 2015/0245103 A1* | 8/2015 | Conte | G06Q 30/0643 725/60 |
| 2015/0310523 A1* | 10/2015 | Silvernail | G06Q 30/0623 705/313 |
| 2015/0365725 A1* | 12/2015 | Belyaev | H04N 21/6175 725/46 |
| 2016/0034430 A1* | 2/2016 | Beavers | G06F 3/0483 715/205 |
| 2016/0080820 A1* | 3/2016 | Lee | H04L 67/306 725/34 |
| 2016/0094875 A1 | 3/2016 | Peterson et al. | |
| 2016/0189752 A1* | 6/2016 | Galant | G11B 27/28 386/224 |
| 2016/0322054 A1 | 11/2016 | Bloch et al. | |
| 2017/0032820 A1* | 2/2017 | Davis, III | H04N 21/4751 |
| 2017/0098465 A1* | 4/2017 | Karve | H04N 21/812 |
| 2017/0134776 A1* | 5/2017 | Ranjeet | G11B 27/031 |
| 2017/0134807 A1 | 5/2017 | Shaw et al. | |
| 2017/0178692 A1* | 6/2017 | Wouhaybi | H04N 21/858 |
| 2017/0199934 A1* | 7/2017 | Nongpiur | G10L 25/51 |
| 2017/0293860 A1* | 10/2017 | Fyffe | G06N 5/04 |
| 2018/0063563 A1* | 3/2018 | Calvert | H04N 5/765 |
| 2018/0068019 A1* | 3/2018 | Novikoff | G06F 16/739 |
| 2018/0218726 A1* | 8/2018 | Arumugam | G09B 5/04 |
| 2018/0220199 A1* | 8/2018 | Greenberger | G06Q 30/0269 |
| 2019/0052939 A1 | 2/2019 | Wang et al. | |
| 2019/0373330 A1 | 12/2019 | Bloch et al. | |
| 2020/0077142 A1 | 3/2020 | Lavie | |
| 2020/0090659 A1* | 3/2020 | Castelli | G06F 16/48 |
| 2020/0145737 A1 | 5/2020 | Su et al. | |
| 2020/0174996 A1* | 6/2020 | True | G06F 11/3438 |
| 2020/0259876 A1* | 8/2020 | Evans | A63F 13/843 |
| 2020/0260160 A1 | 8/2020 | Watson | |
| 2021/0029393 A1 | 1/2021 | Bermeister | |
| 2021/0274245 A1 | 9/2021 | Cava | |
| 2022/0020363 A1* | 1/2022 | Vasquez | G10L 15/22 |
| 2022/0033077 A1* | 2/2022 | Myslinski | G06T 7/20 |
| 2022/0070528 A1* | 3/2022 | Kuo | G06F 3/167 |
| 2022/0167068 A1* | 5/2022 | Zavesky | H04N 21/4532 |
| 2022/0191600 A1* | 6/2022 | Gupta | H04N 21/812 |

* cited by examiner

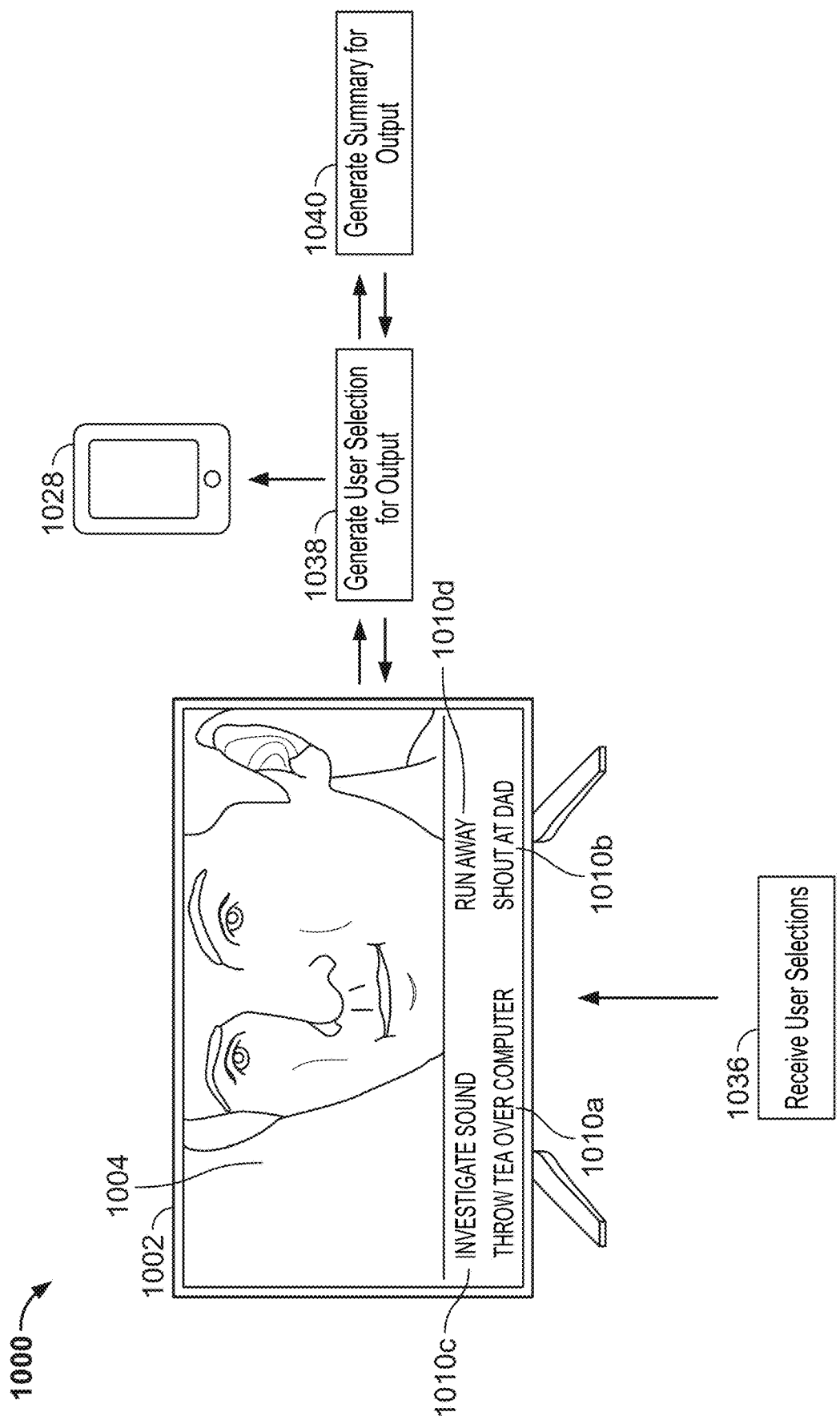

SYSTEMS AND METHODS TO ENHANCE INTERACTIVE PROGRAM WATCHING

BACKGROUND

The present disclosure is directed towards systems and methods for enhancing interactive media program watching. In particular, systems and methods are provided herein that enable a subset of segments of an interactive media asset to be identified and generated for output and/or that enable the generation of a summary of at least one segment of an interactive media asset.

SUMMARY

With the proliferation of over-the-top (OTT) media providers, such as Netflix, Amazon Prime Video, Hulu and Disney+, it is possible to deliver media formats to users that were not possible via traditional broadcasting methods. For example, users can view interactive media assets where it is possible to choose one or more segments, from a list of different segments, to be displayed, thereby creating a personalized viewing experience. When watching an interactive media asset, a user may view a common segment of the media asset, be presented with a choice of alternative segments to view, choose a segment to view, view the chosen segment and then view a second common segment. However, for some users, being presented with choices may present a dilemma, in that they cannot decide which choice to pick. In other scenarios, where there are multiple users viewing the same interactive media asset, the users may disagree on which choice to pick. Users may only have a limited amount of time to consume a media asset. Whereas it is straightforward to ascertain a total running time of a traditional, linear media asset, it is not necessarily straightforward to ascertain the total running time of an interactive media asset, as the choices made may impact the total running time. Users may also be curious about what happens if they make different choices and/or about the content related to different choices. Further, if, for example, two friends watch an interactive media asset, they may have had very different viewing experiences based on the choices they made. If the friends attempt to discuss the interactive media asset the next day, they may struggle to find common ground due to the different viewing experiences.

In view of the foregoing, it would be beneficial to have a system that is capable of enhancing interactive media program watching. More specifically, systems and methods are provided herein that enable a subset of segments of an interactive media asset to be identified and generated for output and/or that enable the generation of a summary of at least one segment of an interactive media asset.

Systems and methods are described herein for determining a subset of available paths of an interactive media program to generate for output. In accordance with a first aspect of the disclosure, a method is provided for determining a subset of available paths of an interactive media program to generate for output. The method includes receiving, at a computing device, the interactive media program, wherein the interactive media program comprises a plurality of alternative segments followed by a common segment; accessing a user profile and identifying, based on the user profile, a subset of the plurality of alternative segments. A set of options is generated for output, wherein the set of options enables one of the alternative segments to be selected from the identified subset of the alternative segments. A selection of an option of the set of options is received, wherein the option is a first option, and, based on the selected option, a first segment of the subset of the plurality of alternative segments is generated for output.

Generating a set of options for output may comprise displaying the options on a display of a computing device. In other examples, generating a set of options for output may comprise generating an audio signal that details the set of options. A selection of an option may take place via a touch event on a computing device, via a remote control of a smart television and/or via a user speaking an option and the user's speech being interpreted by voice recognition software. An audiobook app may generate an audio signal based on the text of the audio book and display a set of options to a user on a display of a computing device, wherein the options are via a touch event. Outputting a segment may comprise displaying the segment in the case of a program comprising video content and/or outputting audio output in the case of a program comprising solely audio and/or audiovisual content. In an example system, a user may access an interactive media program via an OTT application running on a smart television. The interactive media program may be sent from a server, via the internet, to the smart television and be generated for display. On receiving the interactive media program, the application running on the smart television may simultaneously generate the first segment of the interactive media program for display and identify a subset of the alternative segments based on the user profile. In some implementations, an indication of a recommended option based on the user profile may be generated for display along with the set of options. For example, the interactive media program may have five alternative segments, wherein a first segment comprises the two main characters getting married, the second segment comprises the two main characters living together, the third segment comprises the two main characters going on holiday, the fourth segment comprises one of the main characters leaving town and the fifth segment comprises one of the main characters having an affair.

Based on the user profile, the application may identify that the user would only be interested in the first three segments pertaining to, for example, happy endings. The alternative segments may have metadata associated with them that enables an application running on a smart television to identify characteristics associated with each alternative segment in order to aid the application with determining which segments are appropriate for a particular user profile. In other examples, the identification of the subset of segments may take place, for example, at a server remote from the smart television, and an indication of the subset of segments that are suitable for a particular user profile may be sent to the smart television, from the server. In this example, when the user is prompted to choose a segment of the plurality of alternative segments, the user may only be presented with the first three options. If the user proceeds to, for example, choose the second segment, then the segment pertaining to the two main characters living together may be generated for display. After the selected segment has been generated for display, a common segment may then be generated for display. In some examples, an interactive media program may comprise a more than once choice point and associated alternative segments.

Two or more users accessing the interactive media program may be identified. Accessing the user profile may further comprise accessing a user profile for each of at least two of the identified users. Generating the set of options for output may further comprise generating a set of options for output based on the user profiles of at least two of the identified users. Generating the set of options may comprise generating a single set of options for multiple users, based on all of the accessed user profiles. In other examples, a set of options may be generated for each of the accessed user profiles. Receiving the selection of an option may further comprise receiving a selection of a second option. One or more secondary computing devices may be identified, and, based on the selected second option, a second segment may be generated for output at the identified one or more secondary computing devices. In some examples, identifying the users is performed via a camera coupled to the computing device. In some examples, the users may be identified via the selection of multiple user profiles at the application running on the smart television. In other examples, the users may be identified via facial recognition and an image captured via a camera attached to, or integral to, the smart television. Users may also be identified via, for example, a smartphone and/or a smartwatch associated with the user. For example, the smart television may detect that user's smartphone and/or the smartwatch is in proximity to the smart television. This may be performed via, for example, Bluetooth and/or Wi-Fi. The smart television may generate an event that is captured by an application running on the smart television. In other examples, the user may be logged on to a corresponding application running on their smart device. Continuing the above example, the second user may be interested in segments pertaining to an unhappy ending. To address the preferences of both users, options relating to the first, second, fourth and fifth segments may be displayed to the two users.

Identifying a subset of the plurality of alternative segments based on the user profile may further comprise identifying the subset of segments based on at least one of: past viewing behavior, past selections of alternative segments, one or more characters present in each of the alternative segments, or the storyline followed in each of the alternative segments. For example, if a user tends to pick happy endings, only options that pertain to happy endings may be generated for display.

Receiving the selection of an option further may further comprise receiving a selection from a second identified user. One or more secondary computing devices may be identified, and generating the selected segment for output may further comprise generating a selected segment for output, based on the selection from the second identified user, at one of the identified secondary computing devices. In some implementations, an indication of a secondary device on which a selected segment can be viewed may be generated for output with the set of options. In some examples, the set of options may comprise a first set of options and a second set of options. Generating a set of options for output may comprise generating the first set of options for output at the computing device and generating the second set of options for output at a secondary computing device. Continuing the above example, the first user may choose an option relating to the first segment and may watch this segment on the smart television. The second user may choose an option relating to the fourth segment and may watch this segment at a tablet device running, for example, an application that corresponds to the application running on the smart television.

Generating the set of options for output may further comprise generating an indication of a duration of the segment associated with each option. In some examples, a selection of a second option may also be received. A first segment may be generated for output based on the selected first option, and a second segment may be generated for output based on the selected second option. The first segment may be of a first duration and the second segment may be of a second duration, and the second segment may be altered so that its duration is the same as the first duration. For example, a first option may be associated with a segment that is 20 minutes long and a second option may be associated with a segment that is 25 minutes long. The second segment may be altered so that the duration of the second segment is the same as the first segment. This may be achieved by speeding up the runtime of the second segment and/or removing parts (for example, groups of frames) from the second segment. There may be metadata associated with the second segment to indicate which parts may be removed from the second segment in order to reduce the runtime. In other examples, the application may implement a trained model in order to remove parts of the second segment.

Systems and methods are described herein for providing an enhanced viewing experience for one or more users of an interactive media program. In accordance with a second aspect of the disclosure, a method is provided that includes receiving, at a computing device, the interactive media program, wherein the interactive media program comprises a plurality of alternative segments followed by a common segment and receiving a selection of a first alternative segment. The first alternative segment is generated for output and a summary of at least one segment from the plurality of alternative segments is generated. The summary is generated for output, as is the common segment of the interactive media program. In an example system, a user may access an interactive media program via an OTT application running on a smart television. The interactive media program may be sent from a server, via the internet, to the smart television and be generated for display. On receiving the interactive media program, the application running on the smart television may simultaneously generate the first segment of the interactive media program for display. At a choice point, a user may be presented with a number of different options that enable the user to select one of the alternative segments. While the user is watching the selected segment, the application may generate a summary of the other segments and generate the summary for display before the user continues watching the common portion of the interactive media program. In other examples, the summary may be generated at a server remote from the smart television. In some examples, a summary may be pre-generated for each choice that a user could make and, depending on the segment chosen by a user, the pre-generated summary may be sent to the smart television. The summary may comprise one or more of the alternative segments played at an increased playback speed. In other examples, the summary may comprise excerpts, or subsections, from the segments that were not chosen. The summary may be automatically generated by a trained model.

A selection of a second alternative segment may be received, and the second alternative segment may be generated for output. In some examples, only the selected segments may be summarized. In other examples, a user profile may be accessed and, based on the user profile, an interest level in each of the unselected segments may be determined. Generating the summary may further comprise summarizing only the segments that have an associated interest level that is above a threshold value. Determining an interest level may, for example comprise identifying keywords associated with the user profile and identifying keywords in metadata associated with a segment. If, for example, a user profile indicates that a user is interested in comedy and metadata associated with a segment indicates that the segment comprises comedy, then it may be determined that the user may have a relatively high interest level in that segment. If, for example, a user profile indicates that a user is not interested in horror and metadata associated with a segment indicates that the segment comprises comedy, they it may be determined that a user may have a relatively low interest level in that segment. In other examples, a user profile may be grouped with user profiles that indicate similar likes and dislikes. An interest level may be determined based on, for example, the viewing habits associated with other user profiles in the group (i.e., for example, whether users associated with the other user profiles selected a segment). For example, if a segment has a relatively high selection rate associated with other profiles in the group, then a determined that that a user may have a relatively high interest level in that segment. In other examples, a user may manually indict via, for example, a settings menu the types of segment that they are interested in. If a segment matches or is related to a type that a user has indicated that they are interested in, then a relatively high interest level may be determined.

An indication of a bookmark may be received during the output of a segment, and generating the summary further comprises summarizing only a subsection of a segment as indicated by the bookmark. In some examples, each segment of the plurality of segments may be analyzed to identify any subsections of a segment that are related to one or more other segments of the plurality of segments, and an indication of a bookmark may be generated for at least a subset of the identified subsections. For example, if there is a plot line that crosses different segments, then a bookmark may be generated to identify that those subsections of the segments should be summarized.

The first segment may be generated for output at a first computing device, and the second segment may be generated for output at a second computing device. Generating the summary may further comprise generating a first summary based on the first segment and generating a second summary based on the second segment. Generating the summary for output may further comprise generating the first summary for output at the first computing device and generating the second summary for output at the second computing device.

A user profile associated may be accessed, and generating a summary may further comprise identifying a summary duration based, at least in part, on the accessed user profile. For example, a user profile may indicate that a user has a preference for shorter summaries. In other examples, the user profile may be linked to a user's calendar, and the application running on the smart television may determine that a user has a fixed amount of time to fill before, for example, a meeting. The duration of the summary may be based on the time that the user has until the meeting such that the interactive media program finishes before the meeting start.

In some examples, an interactive media program comprising a plurality of alternative segments followed by a common segment may be received at a computing device. A user profile may be accessed and, based on the user profile, a subset of the plurality of alternative segments may be identified. A set of options may be generated for output, wherein the set of options enables one of the alternative segments to be selected from the identified subset of the selectable segments. An option of the set of options may be received and, based on the selected option, a first segment of the subset of the plurality of alternative segments may be generated for output. A summary of at least one segment of the plurality of alternative segments may be generated. The summary and the common segment of the interactive media program may be generated for output.

BRIEF DESCRIPTIONS OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

The above and other objects and advantages of the disclosure may be apparent upon consideration of the following detailed description, taken in conjunction with the accompanying drawings, in which:

FIG. 10B shows another example environment in which an enhanced viewing experience for one or more users of an interactive media program is provided, in accordance with some embodiments of the disclosure;

Figure 16:
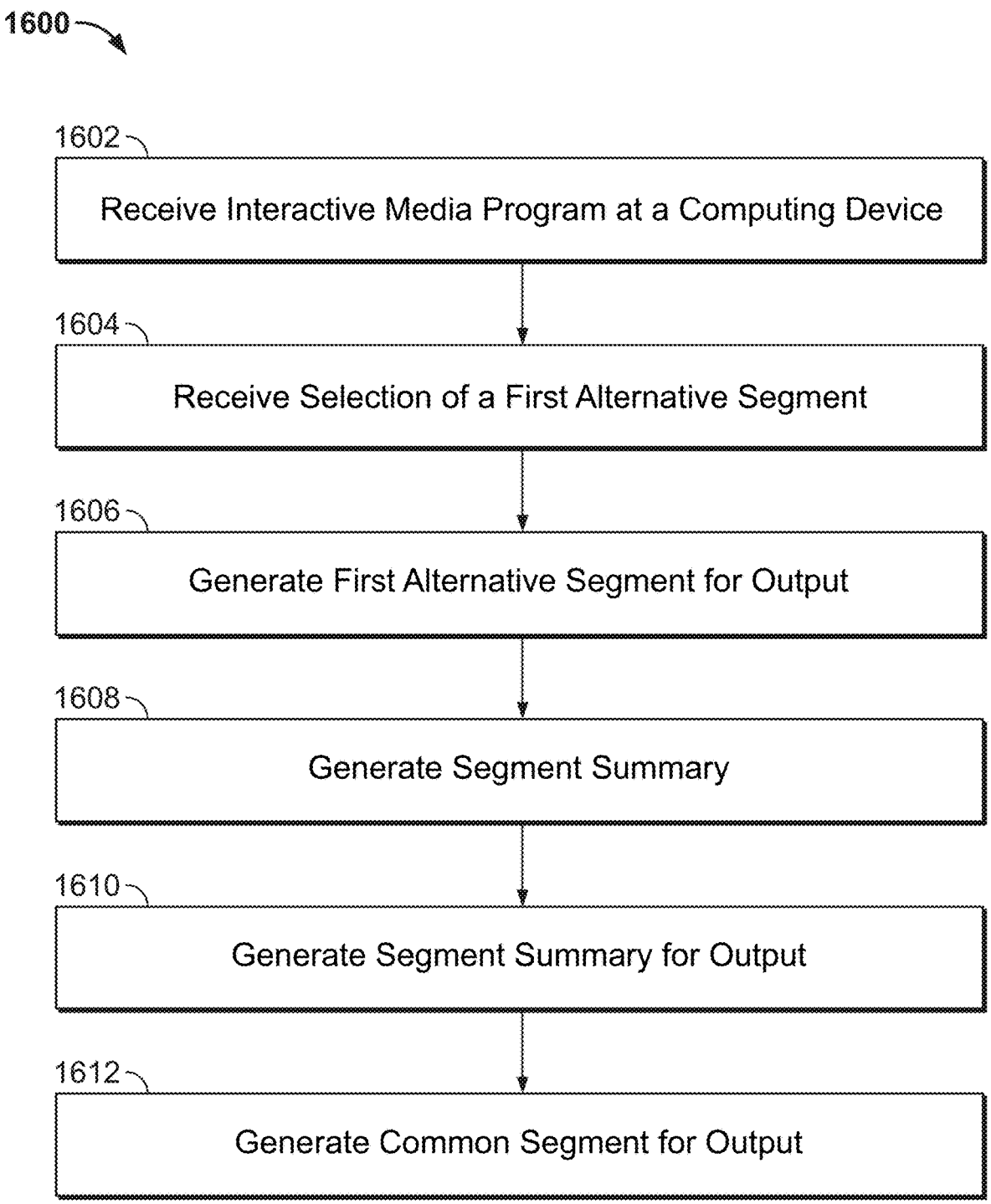
Figure 17:
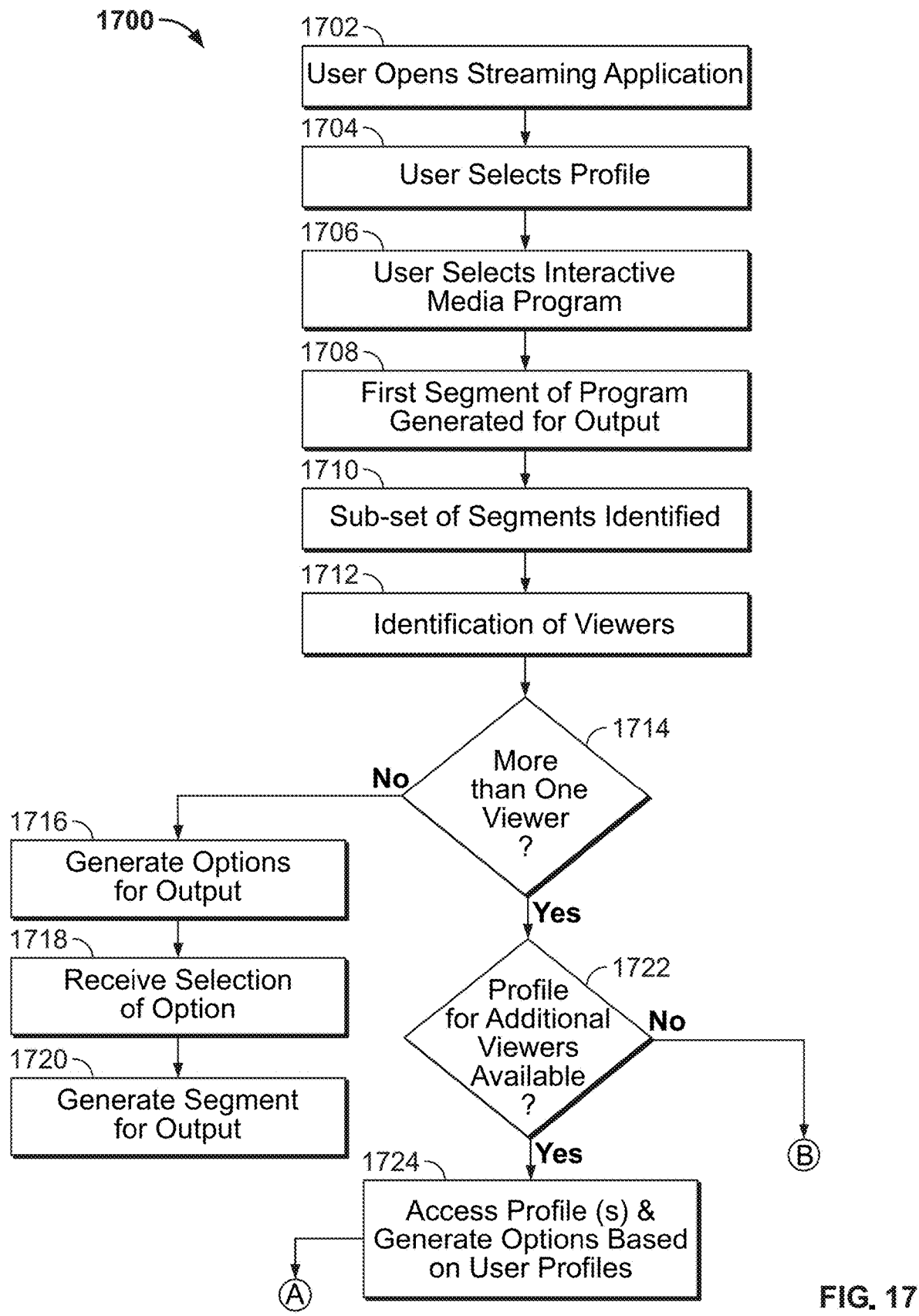
Figure 17:
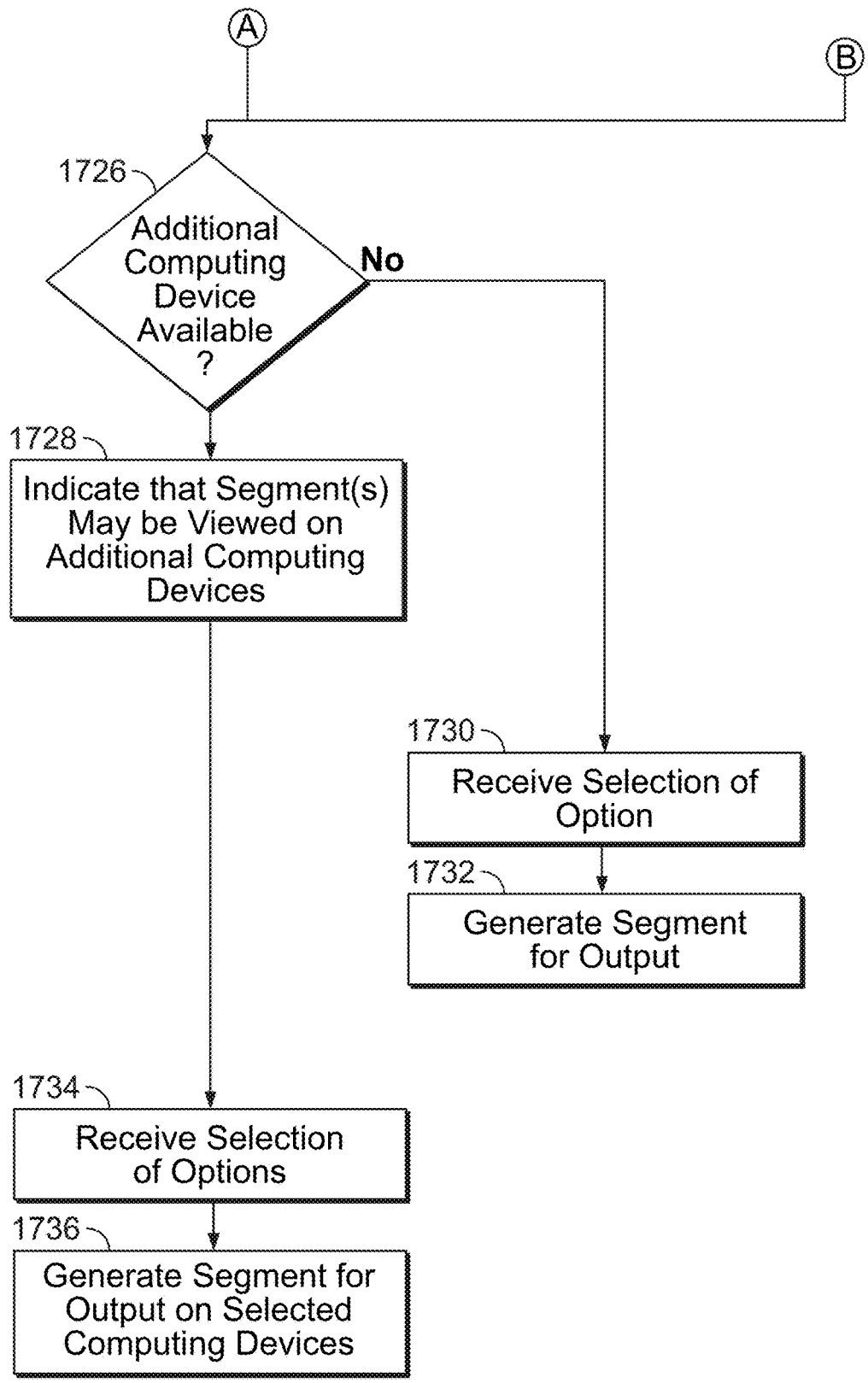

FIG. 16 shows a flowchart of illustrative steps involved for providing an enhanced viewing experience for one or more users of an interactive media program, in accordance with some embodiments of the disclosure; and FIG. 17 shows another a flowchart of illustrative steps involved for determining a subset of available paths of an interactive media program to generate for display, in accordance with some embodiments of the disclosure.

DETAILED DESCRIPTION

Systems and methods are described herein for enhancing interactive media program watching. An interactive media program is any type of media that comprises multiple segments from which a user can select one of the segments for consumption. An interactive media program will comprise at least one common segment that is not chosen by a user and at least one segment that is chosen by a user from a plurality of segments. Typically, the content of the media program will diverge from a first common segment once a user has made a choice and will subsequently converge to a second common segment once the chosen segment has finished. A media program includes audio, video and/or any other media content. Audio includes audio-only content, such as podcasts and stories. Video includes audiovisual content such as movies and/or television programs. An over-the-top content platform may be accessed via a website and/or an app running on a computing device.

The disclosed methods and systems may be implemented on a computing device. As referred to herein, the computing device can be any device comprising a processor and memory, for example, a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, an augmented reality device, a mixed reality device, a virtual reality device, or any other television equipment, computing equipment, or wireless device, and/or combination of the same.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory, including, but not limited to, volatile and non-volatile computer memory or storage devices such as a hard disk, floppy disk, USB drive, DVD, CD, media cards, register memory, processor caches, random access memory (RAM), etc.

Figure 1:
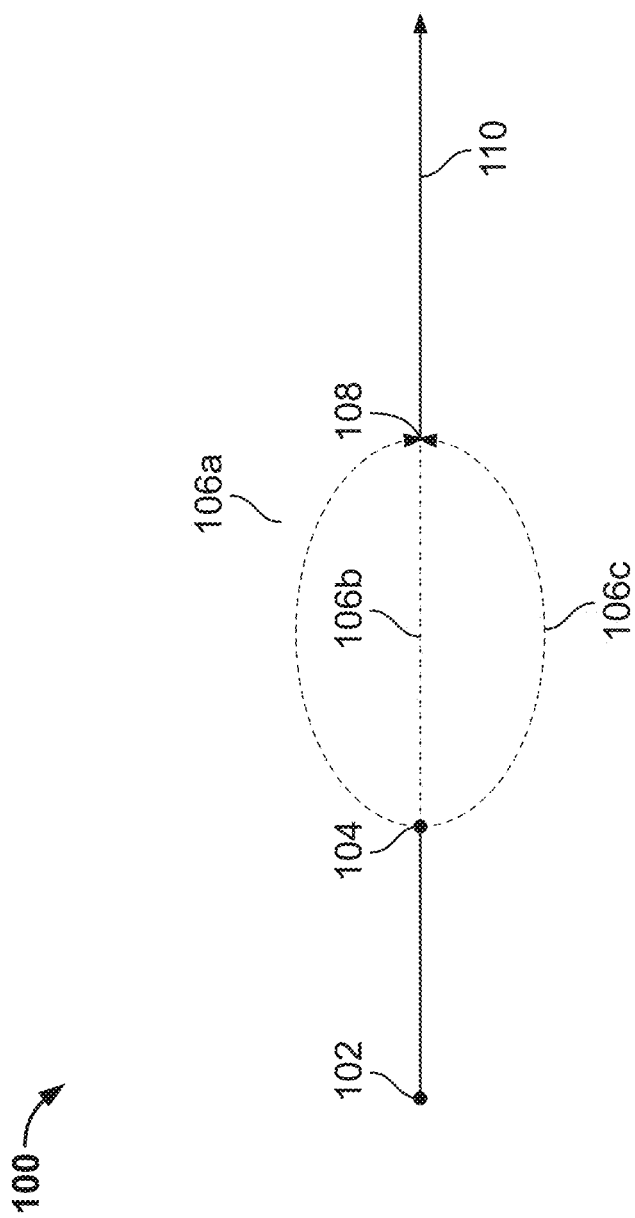
FIG. 1 shows a schematic diagram of the paths of an interactive media program, in accordance with some embodiments of the disclosure.

FIG. 1 shows a schematic diagram of the paths of an interactive media program, in accordance with some embodiments of the disclosure. The paths 100 comprise a start point 102, for example, when a user initiates the playback of an interactive media program. The interactive media program proceeds along a linear path, and a first common segment (i.e., all users are shown the same content) is output (i.e., displayed in the case of a program comprising video content, and/or audio output in the case of a program comprising solely audio and/or audiovisual content) until choice point 104 is reached. The first common segment may comprise a short amount of time, for example, one minute, or a longer amount of time, such as 35 minutes. At choice point 104, the user is presented with, in this example, three options, which are associated with each of the alternative first, second and third segments 106a, 106b and 106c. In some examples, the media program is paused until an option is selected. In other examples, a default choice is selected for a user if no choice is made within a threshold amount of time, for example, 30 seconds. In some examples, the user is able to change the threshold amount of time via, for example, the settings in an application used to output the interactive media asset on a computing device. On the selecting of an option, an alternative segment associated with the selected option is output. For example, if the user selects an option associated with the third segment 106c, the third segment 106c will be output. The segments associated with the unselected options, in this example the first and second segments 106a, 106b, are not output. At segment end point 108, a second common segment 110 is output. Although the example shows only a single choice point, an interactive media program may comprise multiple choice points, each associated with a plurality of alternative segments. In this example, three alternative segments are available for selection; however, it is contemplated that an interactive media program may comprise any number of alternative segments for each choice point, for example, two, three, four, five, six, eight, ten, fifteen or twenty alternative segments.

Figure 2:
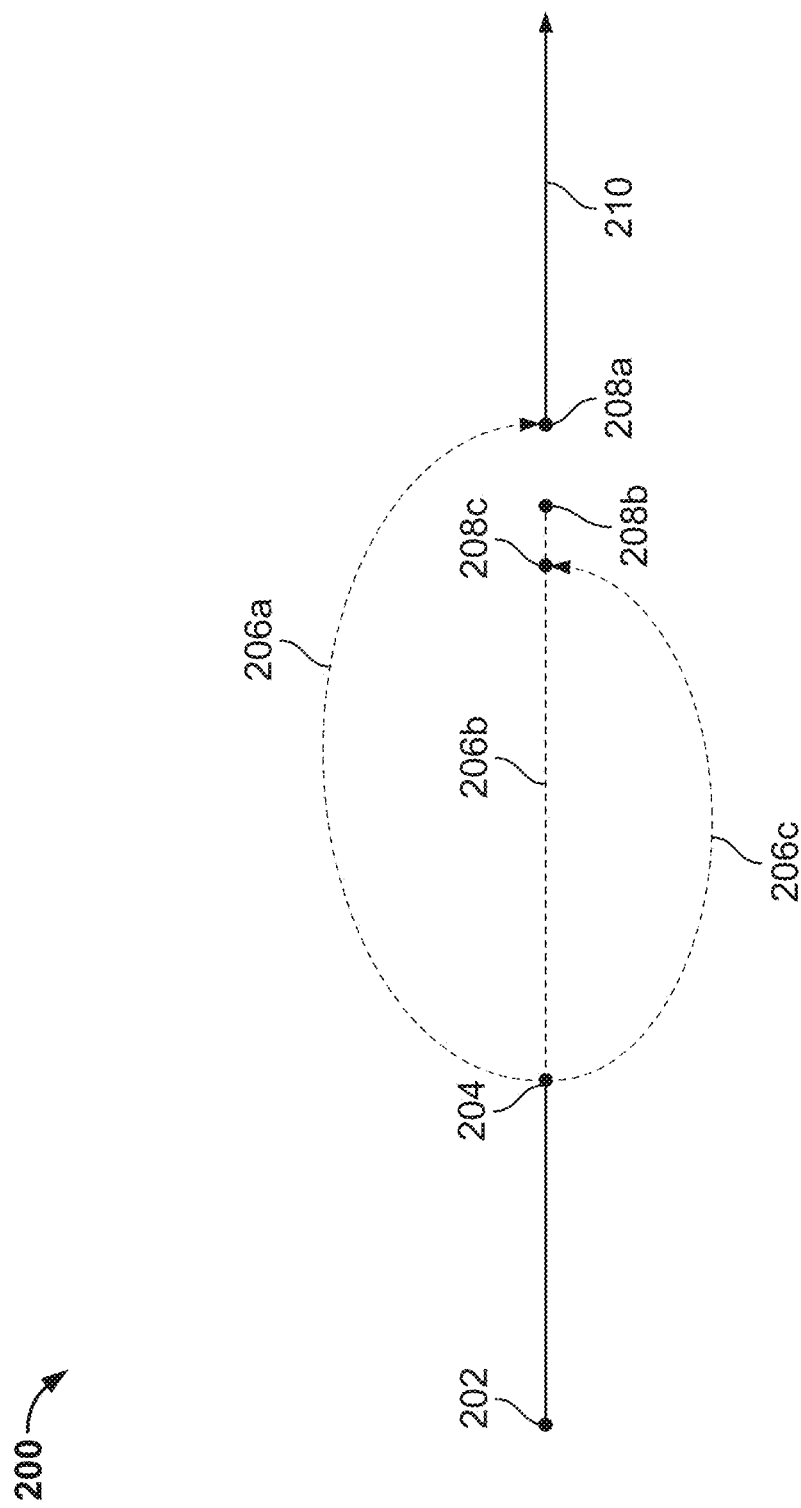
FIG. 2 shows another a schematic diagram of the paths of an interactive media program, in accordance with some embodiments of the disclosure.

FIG. 2 shows another schematic diagram of the paths of an interactive media program, in accordance with some embodiments of the disclosure. In a similar manner to the schematic diagram of FIG. 1, the paths 200 comprise a start point 202, for example, when a user initiates the playback of an interactive media program. The interactive media program proceeds along a linear path, and a first common segment is output until choice point 204 is reached. At choice point 204, the user is presented with, in this example, three options, which are associated with each of the alternative first, second and third segments 206a, 206b and 206c. On the selecting of an option, an alternative segment associated with the selected option is output. For example, if the user selects an option associated with second segment 206b, the second segment 206b will be output. The segments associated with the unselected options, in this example the first and second segments 206a, 206b, are not output. In this example, the first, second and third segments 206a, 206b and 206c are of different durations, as indicated by the different segment endpoints 208a, 208b and 208c. The first segment 208a is of the longest duration, the second segment 208b is of a middling duration, and the third segment 208c is of the shortest duration. Although the alternative segments are of different durations, the same second common segment 210 is output at each of the segment endpoints 208a, 208b and 208c. As such, the overall runtime of the interactive media program may vary in length, depending on which option, and hence segment, is chosen by a user. Although the example shows only a single choice point, an interactive media program may comprise multiple choice points, each associated with a plurality of alternative segments. In this example, three alternative segments are available for selection; however, it is contemplated that an interactive media program may comprise any number of alternative segments for each choice point, for example, two, three, four, five, six, eight, ten, fifteen or twenty alternative segments.

Figure 3:
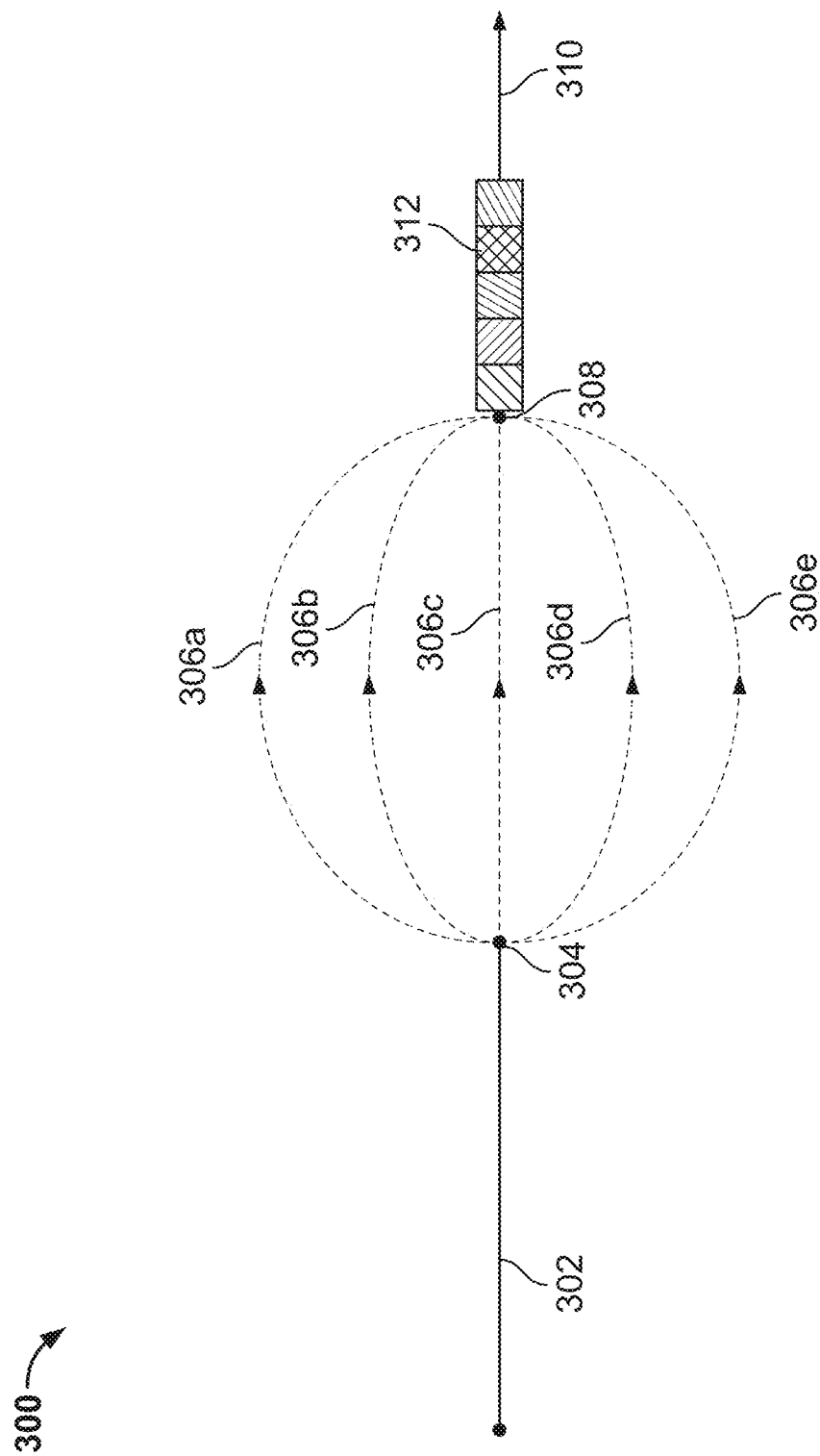
FIG. 3 shows another schematic diagram of the paths of an interactive media program, in accordance with some embodiments of the disclosure.

FIG. 3 shows another schematic diagram of the paths of an interactive media program, in accordance with some embodiments of the disclosure. In a similar manner to the schematic diagram of FIG. 1, the paths 300 comprise a start point 302. The interactive media program proceeds along a linear path, and a first common segment is output until choice point 304 is reached. At choice point 304, the user is presented with, in this example, five options, which are associated with each of the alternative first, second, third, fourth and fifth segments 306a, 306b, 306c, 306d and 306e. On the selecting of an option, an alternative segment associated with the selected option is output. For example, if the user selects an option associated with the fourth segment 306d, the fourth segment 306d will be output. The segments associated with the unselected options, in this example the first, second, third and fifth segments 306a, 306b, 306c and 306e are not output. At segment end point 308, a summary 312 of the segments is output. After the summary 312, the second common segment 310 is output. Although the example shows only a single choice point, an interactive media program may comprise multiple choice points, each associated with a plurality of alternative segments. There may be a summary associated with each of the choice points or only a subset of the choice points. In this example, five alternative segments are available for selection; however, it is contemplated that an interactive media program may comprise any number of alternative segments for each choice point, for example, two, three, four, five, six, eight, ten, fifteen or twenty alternative segments.

Figure 4:
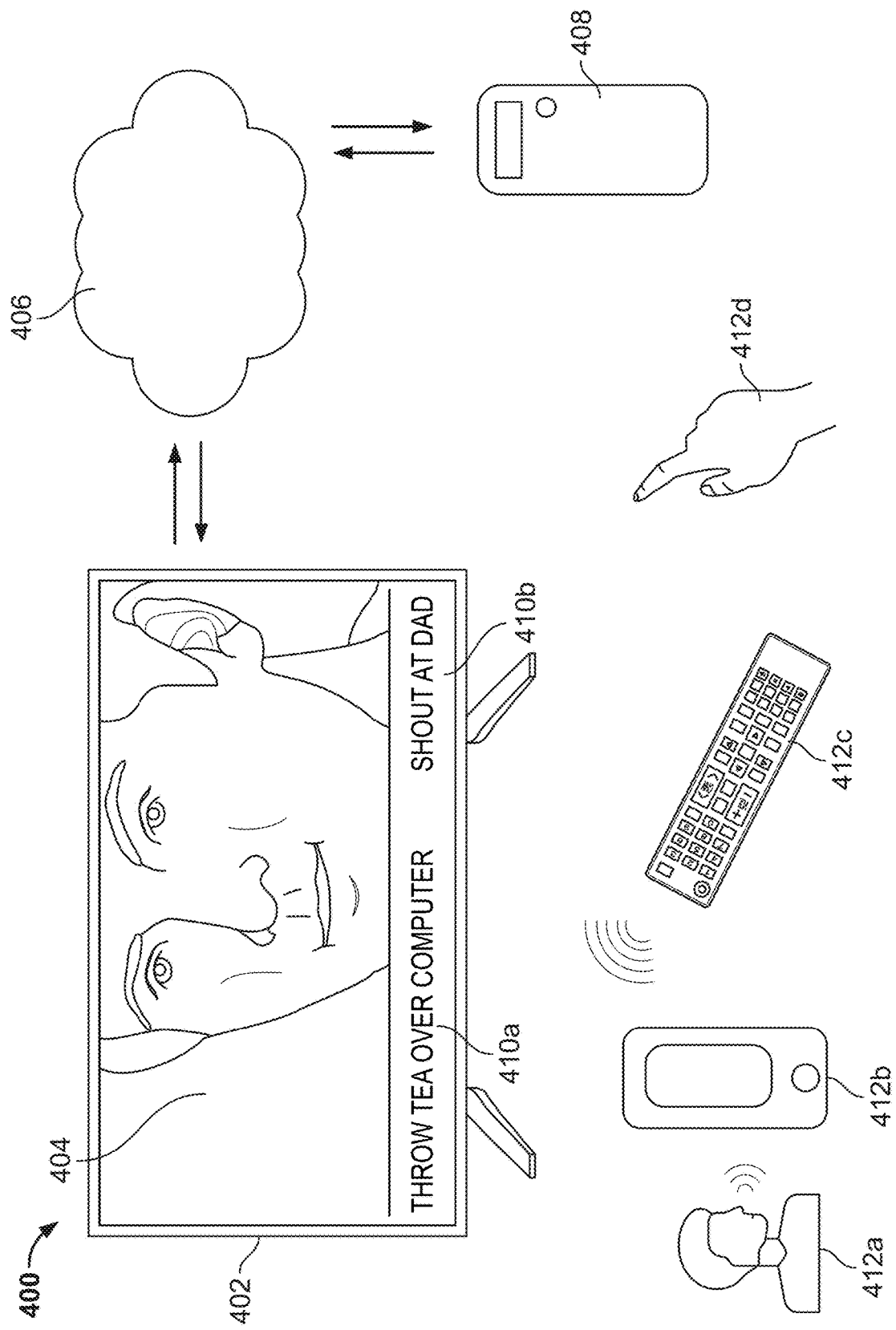
FIG. 4 shows an example environment in which a subset of available paths of an interactive media program to generate for display are determined, in accordance with some embodiments of the disclosure.

FIG. 4 shows an example environment in which a subset of available paths of an interactive media program to generate for display are determined, in accordance with some embodiments of the disclosure. The environment 400 comprises a computing device, in this case a smart television 402, that receives and displays an interactive media program 404 via a network 406 from a server 408. The network 406 may be the internet and may comprise wired and/or wireless means for transmitting the interactive media program 404 from the server 408 to the smart television 402. In some examples, the server is an edge server. In some examples, the smart television 402 runs an application of an OTT provider in order to display the interactive media program 404. At a choice point, such as the choice point discussed in connection with FIGS. 1, 2 and 3, a number of options are displayed on the smart television 402. In this example, a first option 410a comprises "Throw tea over computer" and a second option 410b comprises "Shout at dad." A user may select one of the options 410a, 410b via a voice command 412a that is received via a microphone of the smart television 402 and is interpreted via voice recognition software, via an application running on a computing device, such as a smartphone 412b, that is communicably connected to the smart television 402 via Bluetooth and/or Wi-Fi; via a remote control 412c of the smart television 402; and/or via a touch event 412d, such as touching an option 410a, 410b on a display of the smart television 402. On receiving a selection of an option 410a, 410b, the smart television 402 displays the segment associated with the option.

Figure 5:
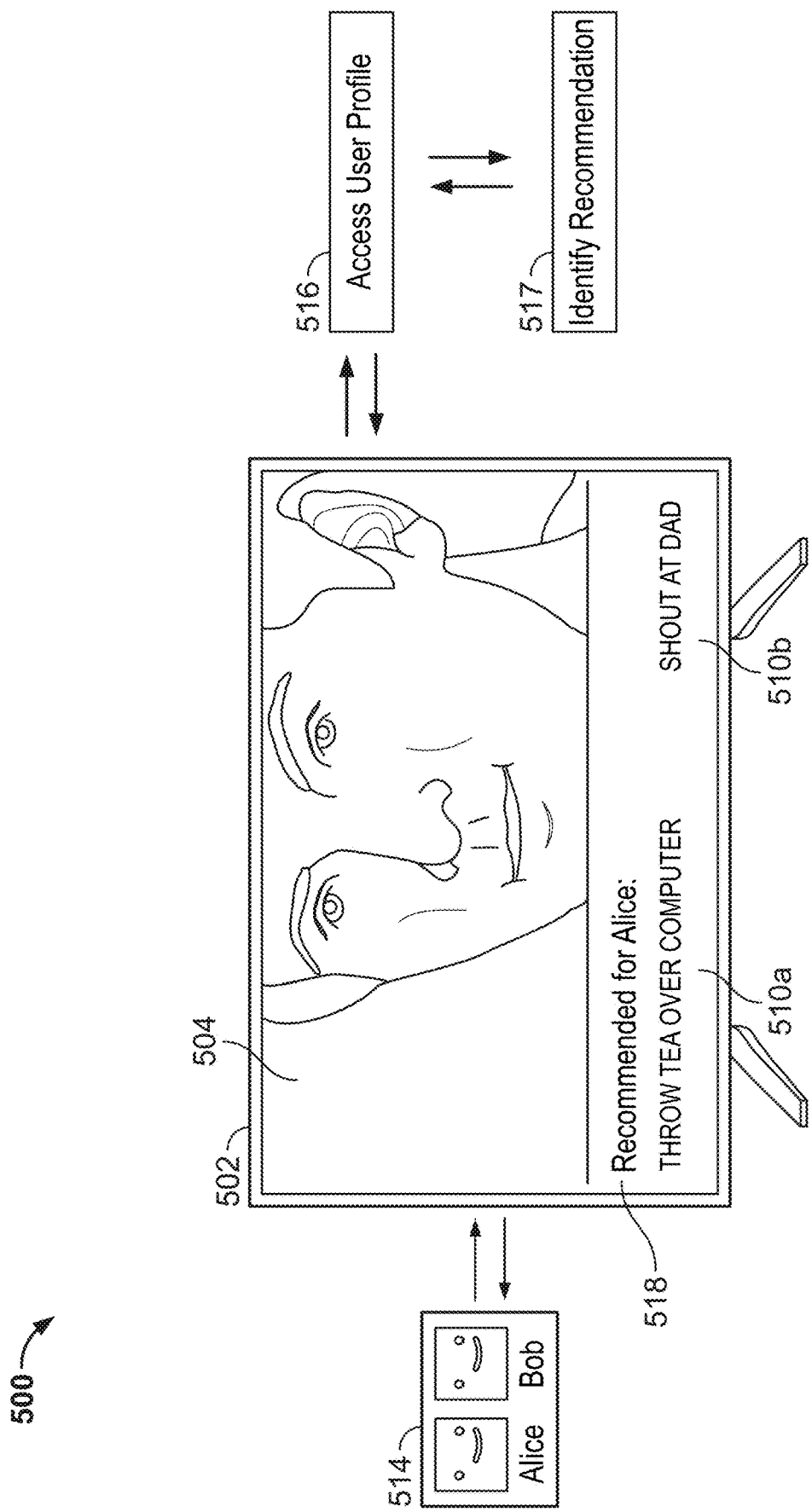
FIG. 5 shows another example environment in which a subset of available paths of an interactive media program to generate for display are determined, in accordance with some embodiments of the disclosure.

FIG. 5 shows another example environment in which a subset of available paths of an interactive media program to generate for display are determined, in accordance with some embodiments of the disclosure. In a similar manner to the environment shown in FIG. 4, the environment 500 comprises a computing device, in this case a smart television 502, that receives and displays an interactive media program 504. As before, the interactive media program may be received, via a network, from a server. The user provides an indication of a user profile 514; for example, when they first open an application associated with an OTT provider on the smart television 502, the smart television 502 may display a selection of user profiles associated with an OTT account. In this example, the user selects the "Alice" user profile. Once the interactive media program 504 has been accessed, and before the choice point is reached, an application running on the smart television 504 accesses 516 the user profile and identifies a recommendation 517 to display to the user in conjunction with the first option 510a and the second option 510b. The user profile may comprise at least one of: past viewing behavior, past selections of alternative segments, one or more characters present in each of the alternative segments and/or the storyline followed in each of the alternative segments. The alternative segments may comprise metadata associated with each segment. The application running on the smart television may access the user profile and the metadata associated with each segment in order to identify a recommendation to display. For example, the user profile may indicate that the user usually chooses segments that are associated with comedy. If an alternative segment is associated with metadata that indicates that a segment comprises comedy, then that segment may be recommended to a user. In this example, the recommendation 518 for the profile "Alice" is to select the first option 510a, "Throw tea over computer." The user may choose to select the recommended option or may choose to select the option that is not recommended. In some examples, the recommended option may be automatically selected on behalf of a user. In other examples, the recommended option may be selected after a timeout period, for example after, 30 seconds. The option may be selected via any of the means discussed in connection with FIG. 4. On receiving a selection of an option 510a, 510b, the smart television 502 displays the segment associated with the option.

Figure 6A:
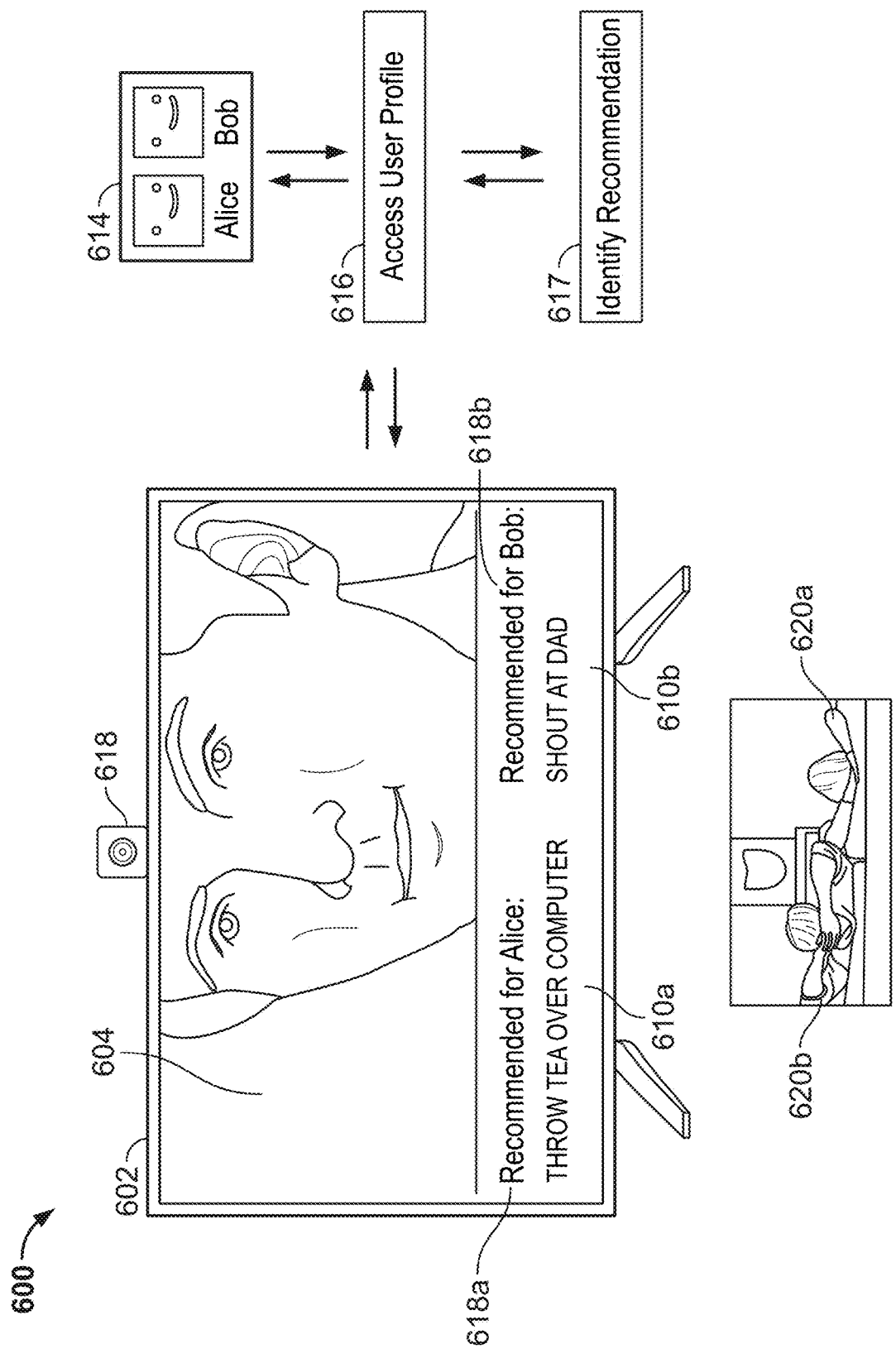
FIG. 6A shows another example environment in which a subset of available paths of an interactive media program to generate for display are determined, in accordance with some embodiments of the disclosure.

FIG. 6A shows another example environment in which a subset of available paths of an interactive media program to generate for display are determined, in accordance with some embodiments of the disclosure. In a similar manner to the environment shown in FIG. 5, the environment 600 comprises a computing device, in this case a smart television 602, that receives and displays an interactive media program 604. As before, the interactive media program may be received, via a network, from a server. The smart television 604 comprises a camera 618 that is used to obtain a capture of the users 620a, 620b. An application running on the smart television 604 uses image recognition to identify the users 620a, 620b. In this example, the users are identified as Alice 620a and Bob 620b. Before the choice point is reached, an application running on the smart television 604 accesses 616 a user profile 614 associated with each of the identified users 620a, 620b. Based on the user profiles 614, the application identifies recommendations 617 to display to the users in conjunction with the first option 610a and the second option 610b. The user profiles may comprise at least one of: past viewing behavior, past selections of alternative segments, one or more characters present in each of the alternative segments and/or the storyline followed in each of the alternative segments. The alternative segments may comprise metadata associated with each segment. The application running on the smart television may access the user profile and the metadata associated with each segment in order to identify a recommendation to display. For example, the user profile may indicate that the user usually chooses segments that are associated with comedy. If an alternative segment is associated with metadata that indicates that a segment comprises comedy, then that segment may be recommended to a user. In this example, the recommendation 618a for the profile "Alice" is to select the first option 610a, "Throw tea over computer," and the recommendation 618b for the profile "Bob" is to select the second option 610b. A user may choose to select the recommended option or may choose to select the option that is not recommended. In some examples, a recommended option may be automatically selected on behalf of a user. In other examples, a recommended option may be selected after a timeout period, for example, after 30 seconds. The option may be selected via any of the means discussed in connection with FIG. 4. On receiving a selection of an option 610a, 610b, the smart television 602 displays the segment associated with the option.

Figure 6B:
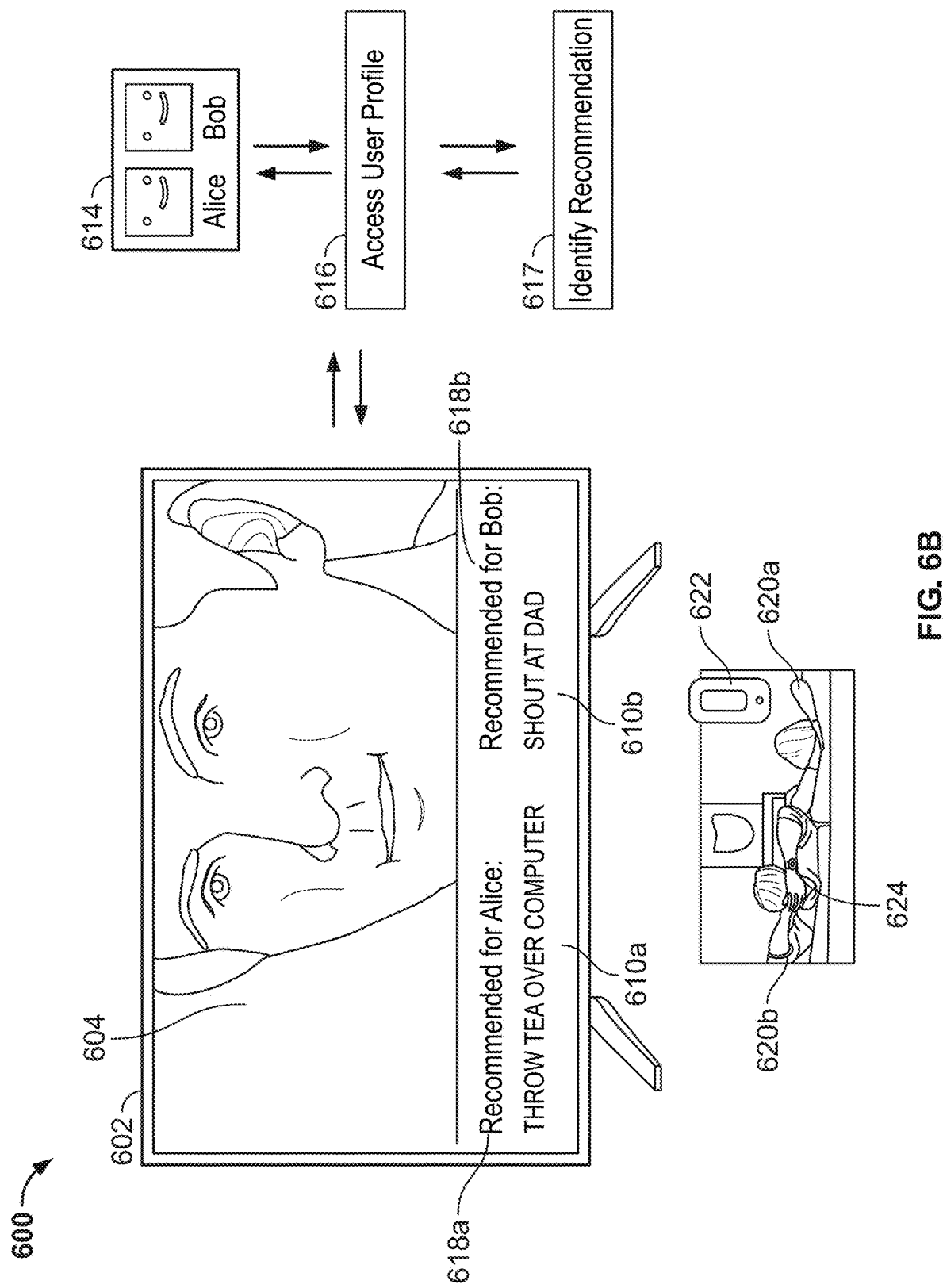
FIG. 6B shows another example environment in which a subset of available paths of an interactive media program to generate for display are determined, in accordance with some embodiments of the disclosure.

FIG. 6B shows another example environment in which a subset of available paths of an interactive media program to generate for display are determined, in accordance with some embodiments of the disclosure. In a similar manner to the environment shown in FIG. 6A, the environment 600 comprises a computing device, in this case a smart television 602, that receives and displays an interactive media program 604. As before, the interactive media program may be received, via a network, from a server. An application running on the smart television 604 identify the users 620a, 620b via a user's personal computing device 622, 624. In this example, Alice 620a is identified via her smartphone 622. For example, the smartphone 622 may be communicably coupled to the smart television 602 via, for example, Bluetooth and/or Wi-Fi. Bob 620b is identified via his smartwatch 624. For example, the smartwatch 624 may be communicably coupled to the smart television 602 via, for example, Bluetooth and/or Wi-Fi. The smart television 602 may identify the users via a MAC address of their computing device 622, 624 and/or a profile associated with each computing device 622, 624. In this example, the users are identified as Alice 620a and Bob 620b. Before the choice point is reached, an application running on the smart television 604 accesses 616 a user profile 614 associated with each of the identified users 620a, 620b. Based on the user profiles 614, the application identifies recommendations 617 to display to the users in conjunction with the first option 610a and the second option 610b. The user profiles may comprise at least one of: past viewing behavior, past selections of alternative segments, one or more characters present in each of the alternative segments and/or the storyline followed in each of the alternative segments. The alternative segments may comprise metadata associated with each segment. The application running on the smart television may access the user profile and the metadata associated with each segment in order to identify a recommendation to display. For example, the user profile may indicate that the user usually chooses segments that are associated with comedy. If an alternative segment is associated with metadata that indicates that a segment comprises comedy, then that segment may be recommended to a user. In this example, the recommendation 618a for the profile "Alice" is to select the first option 610a, "Throw tea over computer," and the recommendation 618b for the profile "Bob" is to select the second option 610b. A user may choose to select the recommended option or may choose to select the option that is not recommended. In some examples, a recommended option may be automatically selected on behalf of a user. In other examples, a recommended option may be selected after a timeout period, for example, after 30 seconds. The option may be selected via any of the means discussed in connection with FIG. 4. On receiving a selection of an option 610a, 610b, the smart television 602 displays the segment associated with the option.

Figure 7A:
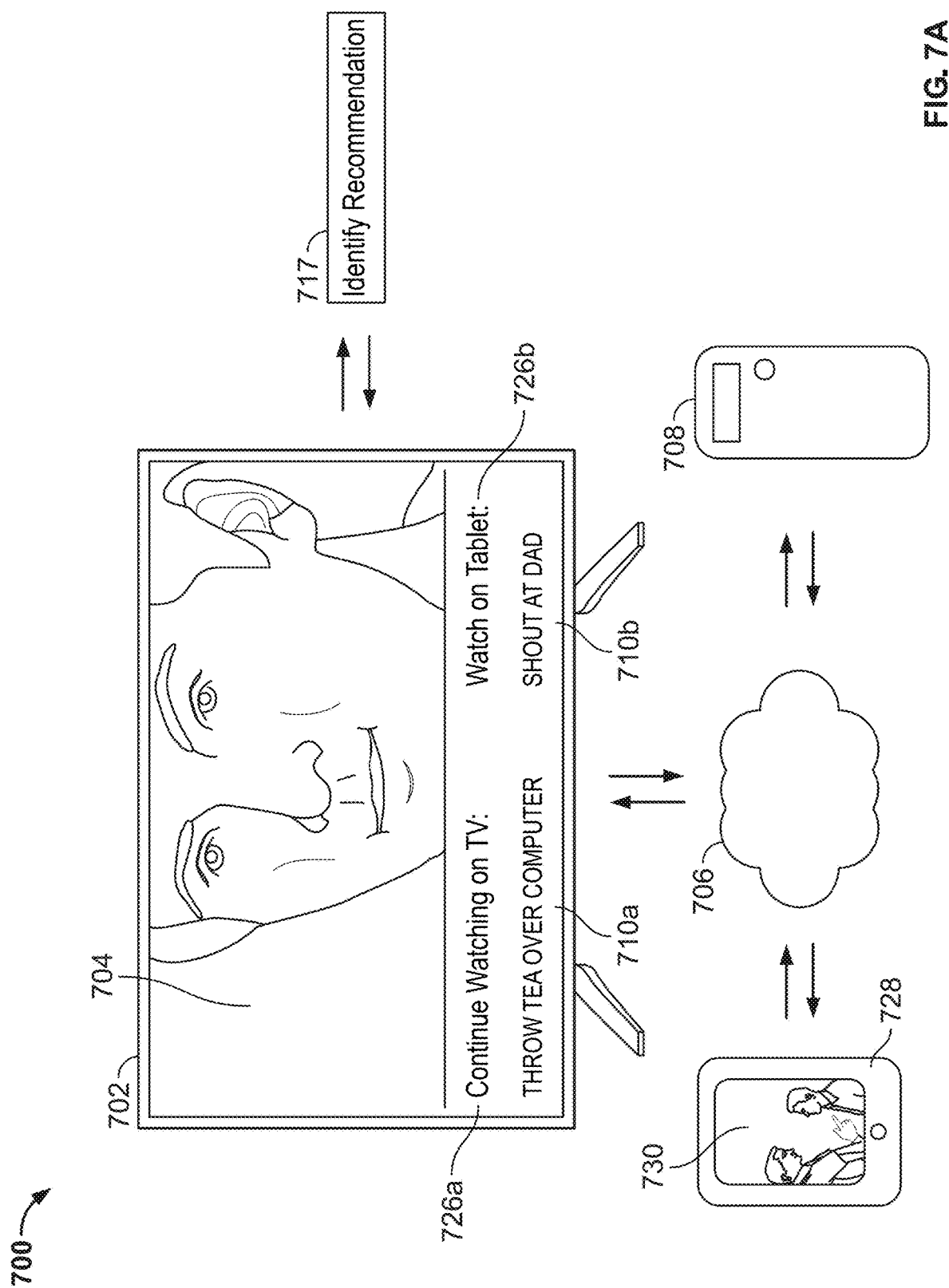
FIG. 7A shows another example environment in which a subset of available paths of an interactive media program to generate for display are determined, in accordance with some embodiments of the disclosure.

FIG. 7A shows another example environment in which a subset of available paths of an interactive media program to generate for display are determined, in accordance with some embodiments of the disclosure. In a similar manner to the environment shown in FIG. 4, the environment 700 comprises a computing device, in this case a smart television 702, that receives and displays an interactive media program 704. As before, the interactive media program may be received, via a network, from a server. Before the choice point is reached, an application running on the smart television 704 identifies recommendations 717 to display to the users in conjunction with the first option 710a and the second option 710b. In this example, the recommendation is based on the screen size of the computing device. For example, segments comprising action scenes may be more suited to a larger screen, whereas segments comprising lots of dialogue may be more suited to a smaller screen. The alternative segments may comprise metadata associated with each segment. The application running on the smart television may access the metadata associated with each segment in order to identify a recommendation to display. In this example, the recommendation 726a is to continue watching the first option 710a, "Throw tea over computer," on the smart television 702, and the recommendation 726b for the second option 710b, "Shout at dad" is to watch the second option on a tablet device. A user may choose to select the recommended option or may choose to select the option that is not recommended. In some examples, a recommended option may be automatically selected on behalf of a user. In other examples, a recommended option may be selected after a timeout period, for example, after 30 seconds. The option may be selected via any of the means discussed in connection with FIG. 4. On receiving a selection of the first option 710*a*, which is recommended to watch on the smart television 702, the smart television 702 displays the segment associated with that option. On receiving a selection of the second option 710*b*, which is recommended to watch on a tablet device, a corresponding application running on a tablet device 728 receives the segment associated with the option via a network 706 and displays the segment 730 on the tablet device 728.

Figure 7B:
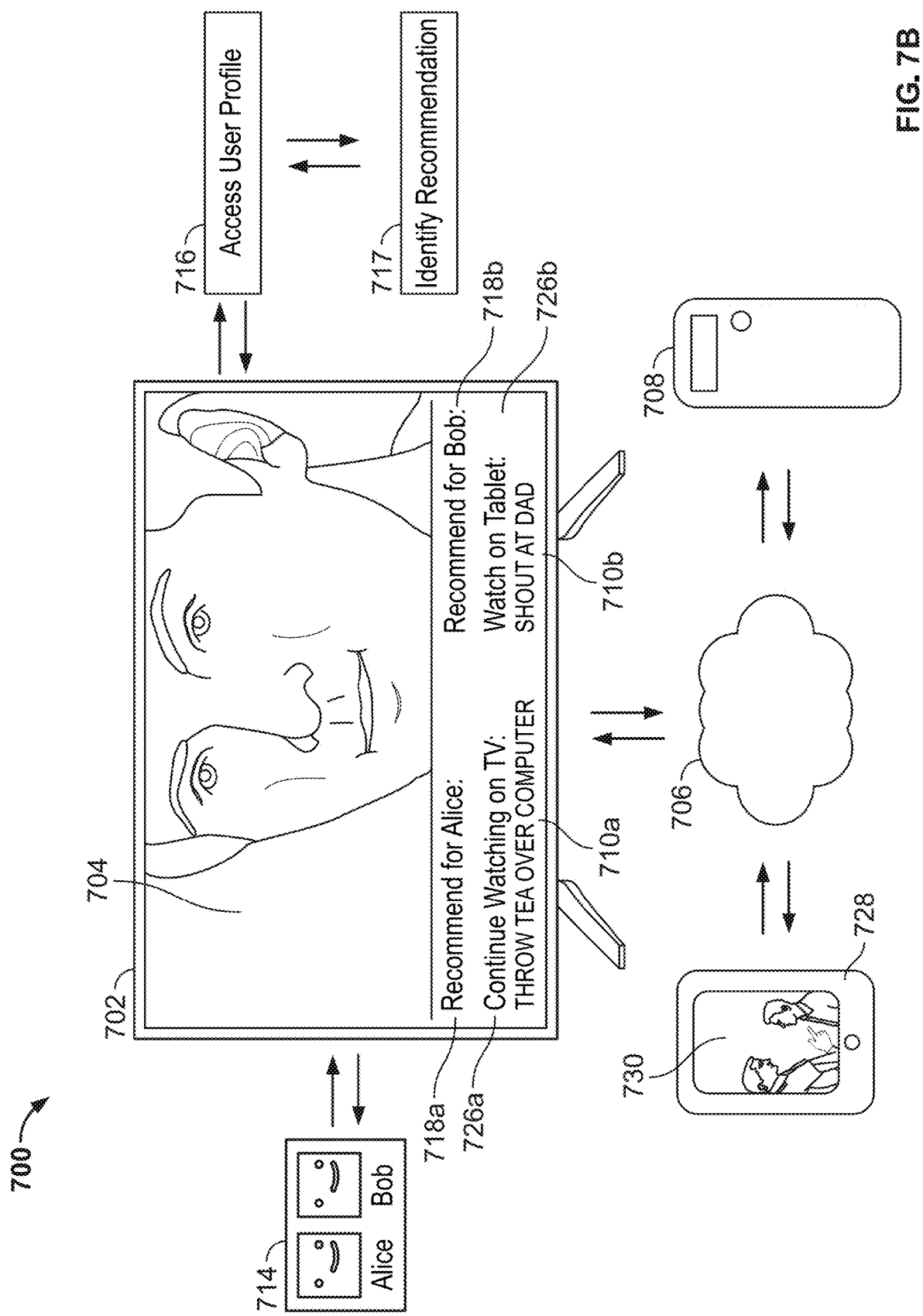
FIG. 7B shows another example environment in which a subset of available paths of an interactive media program to generate for display are determined, in accordance with some embodiments of the disclosure.

FIG. 7B shows another example environment in which a subset of available paths of an interactive media program to generate for display are determined, in accordance with some embodiments of the disclosure. In a similar manner to the environment shown in FIG. 7A, the environment 700 comprises a computing device, in this case a smart television 702, that receives and displays an interactive media program 704. As before, the interactive media program may be received, via a network, from a server. Before the choice point is reached, an application running on the smart television 704 identifies recommendations 717 to display to the users in conjunction with the first option 710*a* and the second option 710*b*. In this example, the recommendation is based both on the user's profile and the screen size of the computing device. The user profiles may comprise at least one of: past viewing behavior, past selections of alternative segments, one or more characters present in each of the alternative segments and/or the storyline followed in each of the alternative segments. For example, segments comprising action scenes may be more suited to a larger screen, whereas segments comprising lots of dialogue may be more suited to a smaller screen. The alternative segments may comprise metadata associated with each segment. The application running on the smart television may access the metadata associated with each segment in order to identify a recommendation to display. In this example, the recommendation 718*a*, 726*a* is for Alice to continue watching the first option 710*a*, "Throw tea over computer," on the smart television 702, and the recommendation 718*b*, 726*b* for the second option 710*b*, "Shout at dad" is for Bob to watch it on a tablet device. A user may choose to select the recommended option or may choose to select the option that is not recommended. In some examples, a recommended option may be automatically selected on behalf of a user. In other examples, a recommended option may be selected after a timeout period, for example, after 30 seconds. The option may be selected via any of the means discussed in connection with FIG. 4. On receiving a selection of the first option 710*a*, which is recommended to watch on the smart television 702, the smart television 702 displays the segment associated with that option. On receiving a selection of the second option 710*b*, which is recommended to watch on a tablet device, a corresponding application running on a tablet device 728 receives the segment associated with the option via a network 706 and displays the segment 730 on the tablet device 728.

Figure 8:
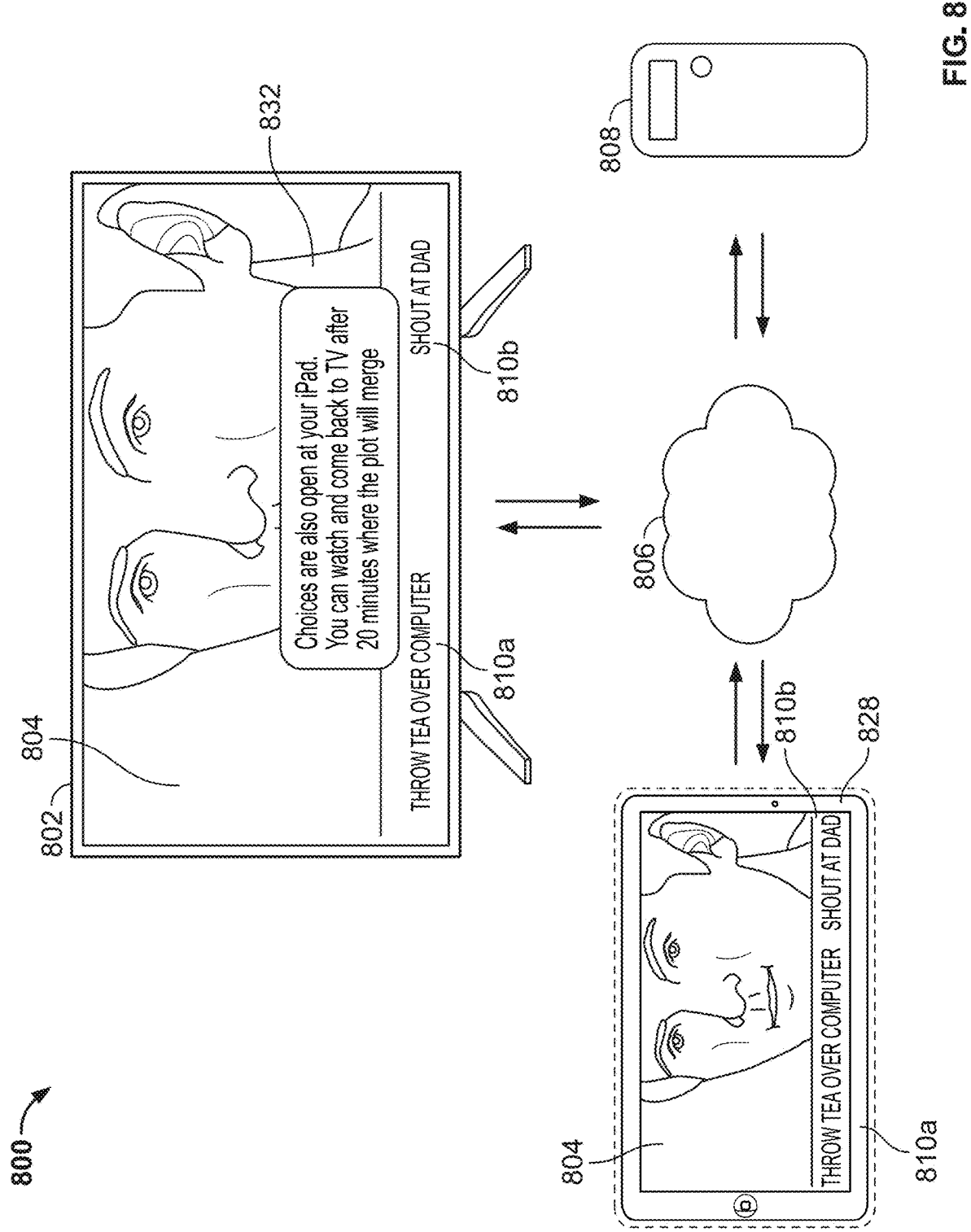
FIG. 8 shows another example environment in which a subset of available paths of an interactive media program to generate for display are determined, in accordance with some embodiments of the disclosure.

FIG. 8 shows another example environment in which a subset of available paths of an interactive media program to generate for display are determined, in accordance with some embodiments of the disclosure. In a similar manner to the environment shown in FIGS. 7A and 7B, the environment 800 comprises a computing device, in this case a smart television 802, that receives and displays an interactive media program 804. As before, the interactive media program may be received, via a network, from a server. When displaying the options 810*a*, 810*b*, an additional message 832 is displayed. In this example, the message 832 informs the users that the options 810*a*, 810*b* are also open at a tablet device 828 and that the options last 20 minutes each. When this message 832 is displayed on the smart television 802, a corresponding application running on the tablet device 828 displays the options 810*a*, 810*b*. A first user can select an option 810*a*, 810*b* on the smart television 802, and a second user can select a (different) option 810*a*, 810*b* at the tablet device 828. As before, the interactive media program 804 may be received at the tablet device 828, via a network 806, from a server 808. Once an alternative segment has been displayed at the smart television 802 and the tablet device 828, a subsequent common segment is then displayed at the smart television 802.

Figure 9:
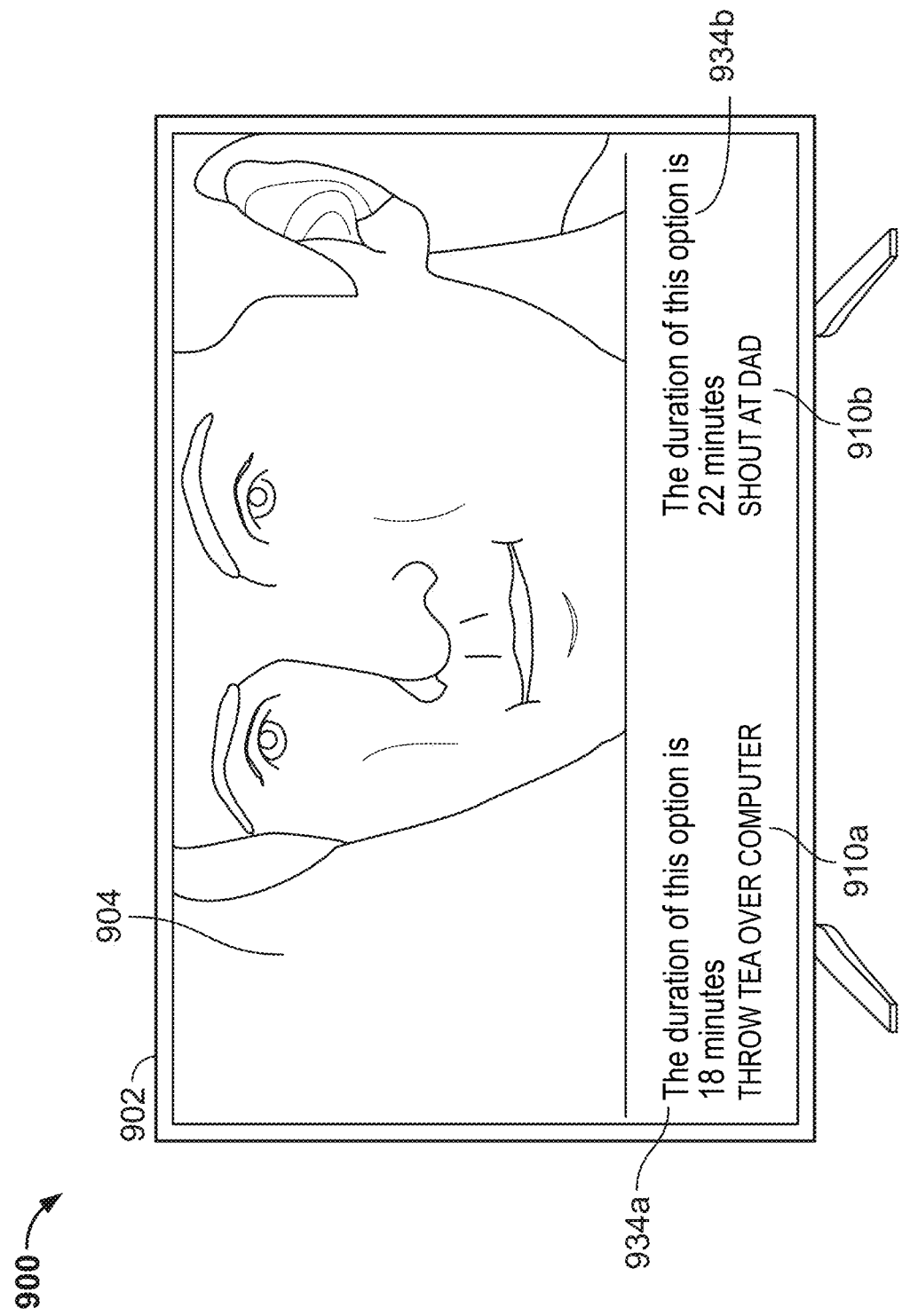
FIG. 9 shows another example environment in which a subset of available paths of an interactive media program to generate for display are determined, in accordance with some embodiments of the disclosure.

FIG. 9 shows another example environment in which a subset of available paths of an interactive media program to generate for display are determined, in accordance with some embodiments of the disclosure. In a similar manner to the environment shown in FIGS. 4-8, the environment 900 comprises a computing device, in this case a smart television 902, that receives and displays an interactive media program 904. As before, the interactive media program may be received, via a network, from a server. When displaying the options 910*a*, 910*b*, additional messages 934*a*, 934*b* that inform the user(s) of the duration of each segment are displayed.

Figure 10A:
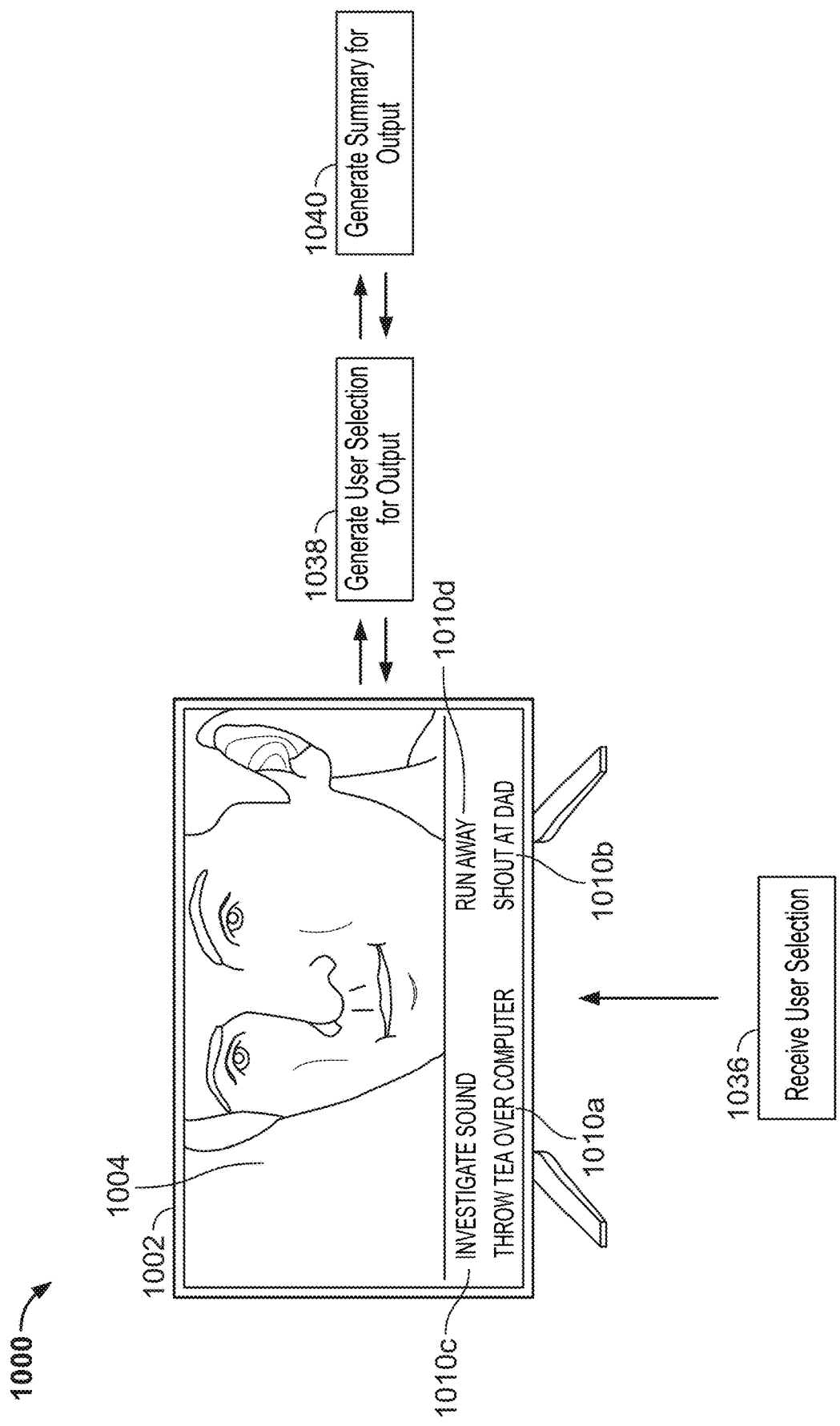
FIG. 10A shows an example environment in which an enhanced viewing experience for one or more users of an interactive media program is provided, in accordance with some embodiments of the disclosure.

FIG. 10A shows an example environment in which an enhanced viewing experience for one or more users of an interactive media program is provided, in accordance with some embodiments of the disclosure. The environment 1000 comprises a computing device, in this case a smart television 1002, that receives and displays an interactive media program 1004. The interactive media program may be received, via a network, such as the internet, from a server. At a choice point, options 1010*a*, 1010*b*, 1010*c* and 1010*d* are displayed on a display of the smart television 1002. On receiving a user selection 1036 of an option (i.e., one of the four options 1010*a*, 1010*b*, 1010*c*, 1010*d*), a segment associated with the user selection is generated for output 1038; in this example, the segment is displayed on a display of the smart television 1002. Once the segment associated with the option has been displayed, a summary of the alternative segments is generated for output 1040 and is displayed at the smart television 1002. The summary may comprise one or more of the alternative segments played at an increased playback speed. In other examples, the summary may comprise excerpts, or subsections, from the segments that were not chosen. The summary may be automatically generated by a trained model. In some examples, the summary is generated on the fly. In other examples, the summary is pre-generated. The summary may be generated at the smart television 1002 or may be generated at a server remote from the smart television and may be transmitted to the smart television 1002 via a network, such as the internet. Once the summary has been displayed at the smart television 1002, a common segment of the interactive media program is displayed at the smart television 1002.

FIG. 10B shows an example environment in which an enhanced viewing experience for one or more users of an interactive media program is provided, in accordance with some embodiments of the disclosure. In a similar manner to the environment shown in FIG. 10A, the environment 1000 comprises a computing device, in this case a smart television 1002, that receives and displays an interactive media program 1004. The interactive media program may be received, via a network, such as the internet, from a server. At a choice point, options 1010*a*, 1010*b*, 1010*c* and 1010*d* are displayed on a display of the smart television 1002. Receiving a user selection 1036 comprises receiving a first selection of an option and a second selection of an option. On receiving the first and section options, segments associated with the user selections are generated for output 1038. A segment associated with the first option is displayed on a display of the smart television 1002, and a segment associated with the second option is displayed on a display of a tablet 1028. Once the segments associated with the selected options have been displayed, a summary of the unselected options is generated for output 1040 and is displayed at the smart television 1002. Once the summary has been displayed at the smart television 1002, a common segment of the interactive media program is displayed at the smart television 1002.

Figure 10C:
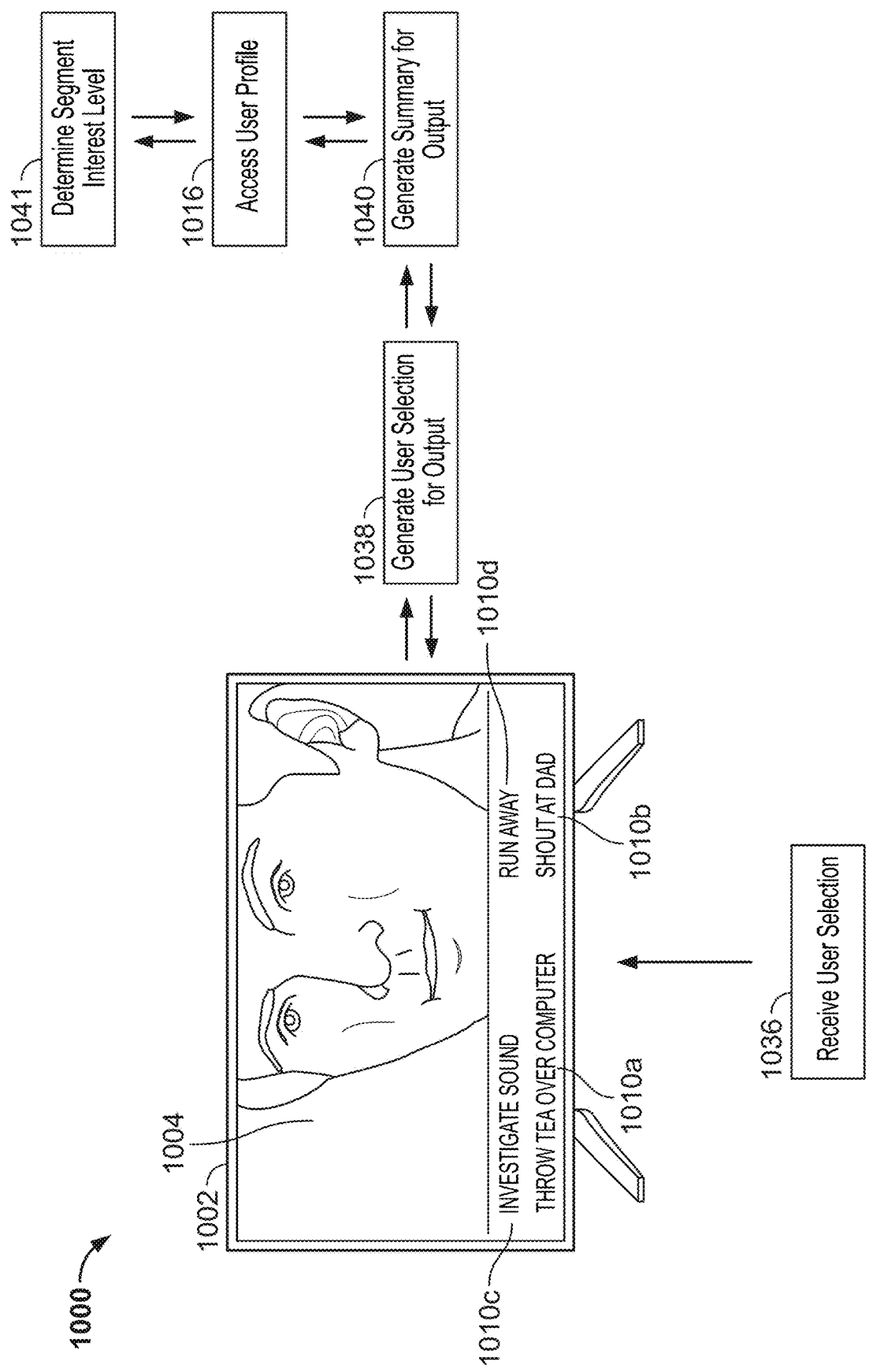
FIG. 10C shows another example environment in which an enhanced viewing experience for one or more users of an interactive media program is provided, in accordance with some embodiments of the disclosure.

FIG. 10C shows an example environment in which an enhanced viewing experience for one or more users of an interactive media program is provided, in accordance with some embodiments of the disclosure. In a similar manner to the environments shown in FIGS. 10A and 10B, the environment 1000 comprises a computing device, in this case a smart television 1002, that receives and displays an interactive media program 1004. The interactive media program may be received, via a network, such as the internet, from a server. At a choice point, options 1010a, 1010b, 1010c and 1010d are displayed on a display of the smart television 1002. On receiving a user selection 1036 of an option (i.e., one of the four options 1010a, 1010b, 1010c, 1010d), a segment associated with the user selection is generated for output 1038; in this example, the segment is displayed on a display of the smart television 1002. Once the segment associated with the option has been displayed, a summary of the alternative segments is generated for output 1040 and is displayed at the smart television 1002. Generating the summary for output 1040 comprises accessing a user profile 1016. The user profile may comprise past viewing behavior, past selections of alternative segments, one or more characters present in each of the alternative segments and/or the storyline followed in each of the alternative segments. The alternative segments may have metadata associated with them that enables an application running on a smart television to identify characteristics associated with each alternative segment in order to aid the application with determining an interest level in each unselected segment. Based on the accessed user profile, an interest level in each of the unselected segments may be determined 1041, and the summary summarizes only the segments that have an associated interest level that is above a threshold value. Once the summary has been displayed at the smart television 1002, a common segment of the interactive media program is displayed at the smart television 1002.

Figure 10D:
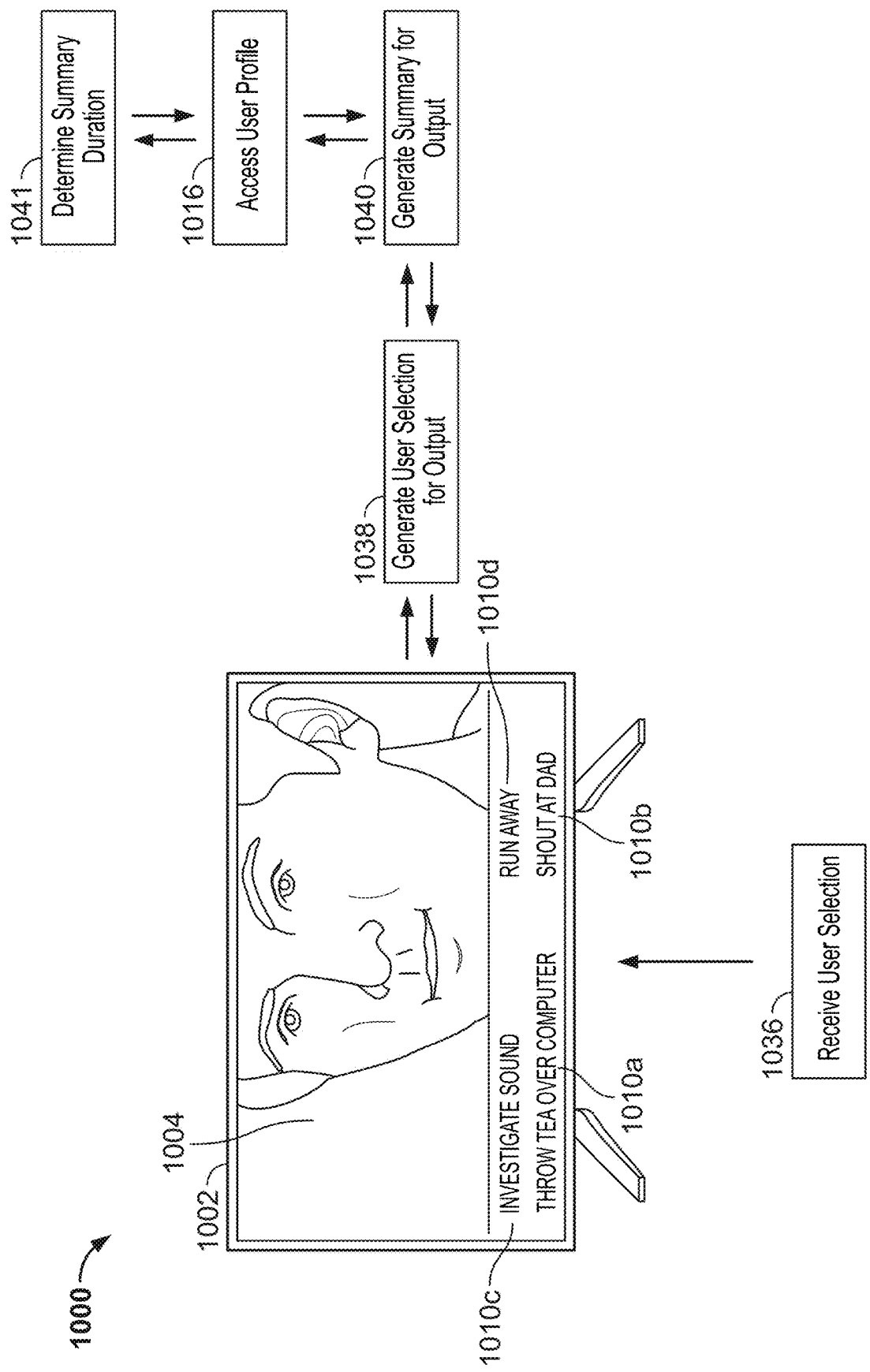
FIG. 10D shows another example environment in which an enhanced viewing experience for one or more users of an interactive media program is provided, in accordance with some embodiments of the disclosure.

FIG. 10D shows an example environment in which an enhanced viewing experience for one or more users of an interactive media program is provided, in accordance with some embodiments of the disclosure. In a similar manner to the environments shown in FIGS. 10A, 10B and 10C, the environment 1000 comprises a computing device, in this case a smart television 1002, that receives and displays an interactive media program 1004. The interactive media program may be received, via a network, such as the internet, from a server. At a choice point, options 1010a, 1010b, 1010c and 1010d are displayed on a display of the smart television 1002. On receiving a user selection 1036 of an option (i.e., one of the four options 1010a, 1010b, 1010c, 1010d), a segment associated with the user selection is generated for output 1038; in this example, the segment is displayed on a display of the smart television 1002. Once the segment associated with the option has been displayed, a summary of the alternative segments is generated for output 1040 and is displayed at the smart television 1002. Generating the summary for output 1040 comprises accessing a user profile 1016. The user profile may comprise past viewing behavior, past selections of alternative segments, one or more characters present in each of the alternative segments and/or the storyline followed in each of the alternative segments. The alternative segments may have metadata associated with them that enables an application running on a smart television to identify characteristics associated with each alternative segment in order to aid the application with determining an interest level in each unselected segment. Based on the accessed user profile, a summary duration is determined 1043, and the generated summary is based on the determined summary duration. In some examples, the summary may be generated to be exactly the identified duration. In other examples, the summary may be generated to be the identified duration, within a threshold amount, for example, if the identified duration is 3 minutes then the generated summary may be 3 minutes±30 seconds. Once the summary has been displayed at the smart television 1002, a common segment of the interactive media program is displayed at the smart television 1002.

Figure 11A:
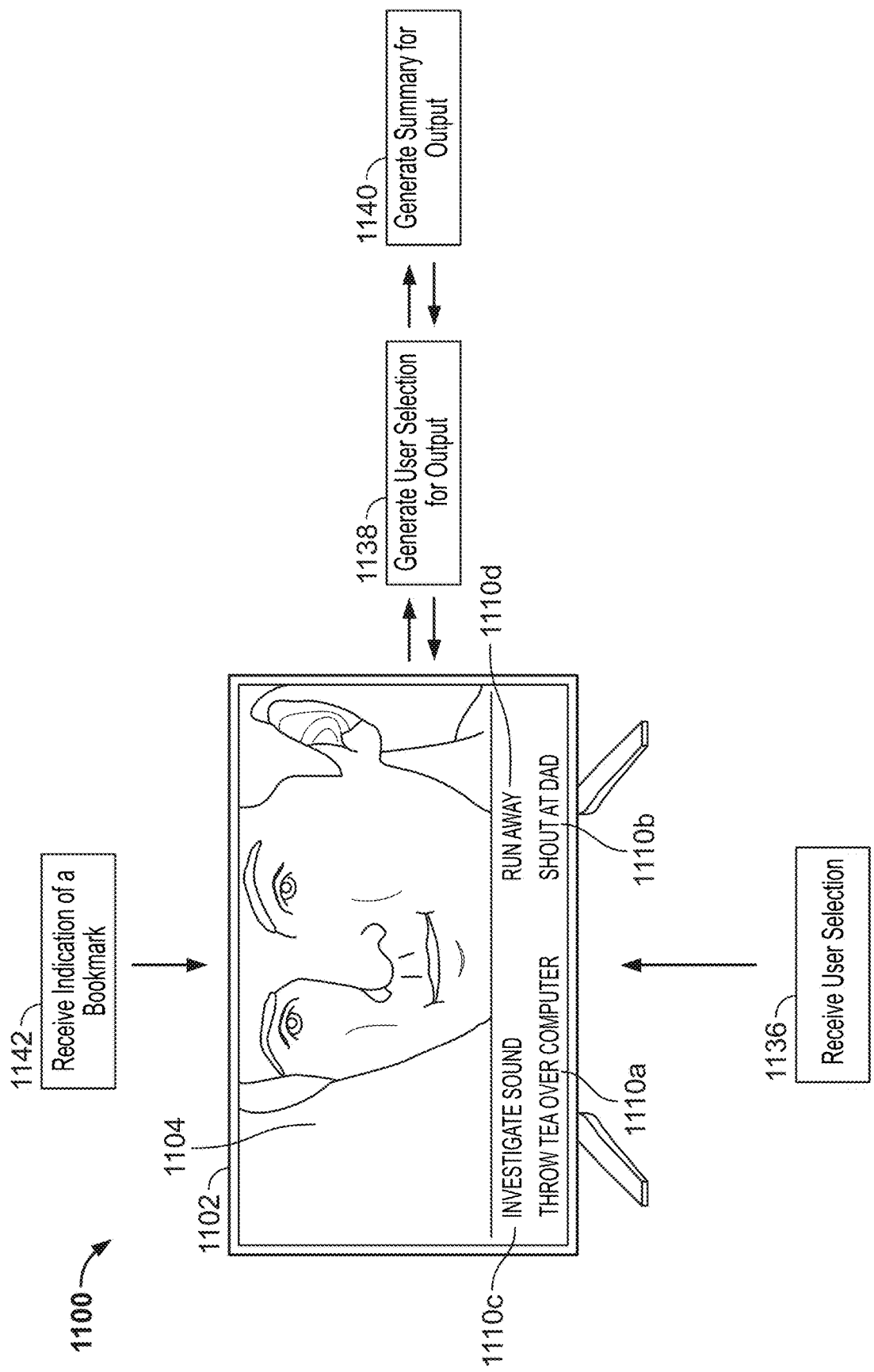
FIG. 11A shows another example environment in which an enhanced viewing experience for one or more users of an interactive media program is provided, in accordance with some embodiments of the disclosure.

FIG. 11A shows another example environment in which an enhanced viewing experience for one or more users of an interactive media program is provided, in accordance with some embodiments of the disclosure. In a similar manner to the environments shown in FIGS. 10A, 10B, 10C and 10D, the environment 1100 comprises a computing device, in this case a smart television 1102, that receives and displays an interactive media program 1104. The interactive media program may be received, via a network, such as the internet, from a server. At a choice point, options 1110a, 1110b, 1110c and 1110d are displayed on a display of the smart television 1102. On receiving a user selection 1136 of an option (i.e., one of the four options 1110a, 1110b, 1110c, 1110d), a segment associated with the user selection is generated for output 1138; in this example, the segment is displayed on a display of the smart television 1102. While the segment is being displayed on a display of the smart television 1102, an indication of a bookmark is received 1142. The indication may be provided by a user, for example by pressing one or more buttons on a remote control of the smart television 1102. In other examples, the indication may be provided via speech and a voice recognition component running on the smart television 1102, by a computing device communicatively coupled with the smart television 1102 and/or by a touch event on a touch screen of the smart television 1102. Once the segment associated with the option has been displayed, a summary of the alternative segments is generated for output 1140 and is displayed at the smart television 1102. Generating the summary for output 1140 comprises summarizing only the bookmarked portions of the segment. Once the summary has been displayed at the smart television 1102, a common segment of the interactive media program is displayed at the smart television 1102.

Figure 11B:
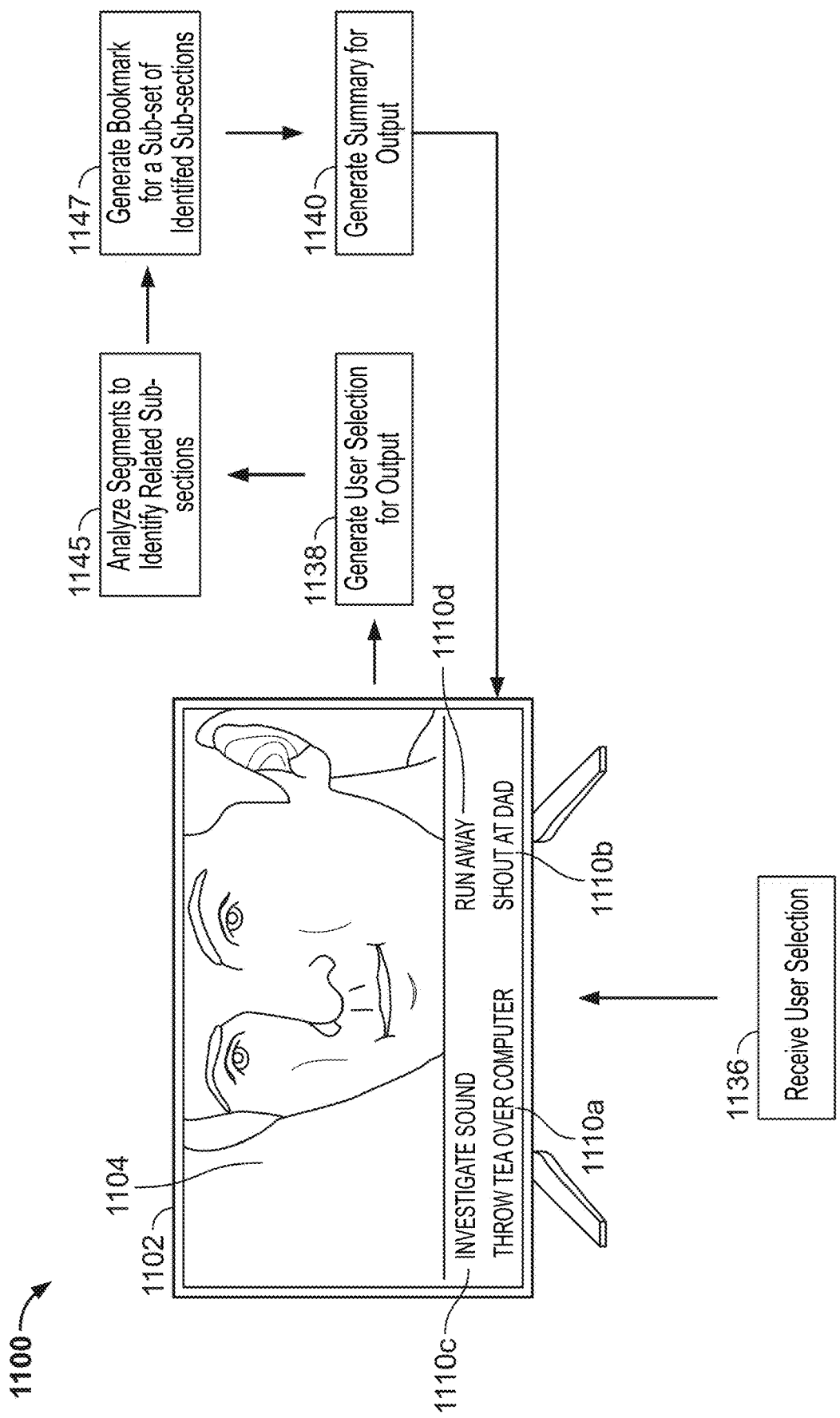
FIG. 11B shows another example environment in which an enhanced viewing experience for one or more users of an interactive media program is provided, in accordance with some embodiments of the disclosure.

FIG. 11B shows another example environment in which an enhanced viewing experience for one or more users of an interactive media program is provided, in accordance with some embodiments of the disclosure. In a similar manner to the environment shown in FIG. 11A, the environment 1100 comprises a computing device, in this case a smart television 1102, that receives and displays an interactive media program 1104. The interactive media program may be received, via a network, such as the internet, from a server. At a choice point, options 1110a, 1110b, 1110c and 1110d are displayed on a display of the smart television 1102. On receiving a user selection 1136 of an option (i.e., one of the four options 1110*a*, 1110*b*, 1110*c*, 1110*d*), a segment associated with the user selection is generated for output 1138; in this example, the segment is displayed on a display of the smart television 1102. While the segment is being displayed on a display of the smart television 1102, the plurality of alternative segments are analyzed to identify related subsections of each of the segments 1145, and one or more bookmarks are generated based on at least a subset of the identified subsections 1147. Once the segment associated with the option has been displayed, a summary of the alternative segments is generated for output 1140 and is displayed at the smart television 1102. Generating the summary for output 1040 comprises summarizing only the bookmarked portions of the segment. Once the summary has been displayed at the smart television 1102, a common segment of the interactive media program is displayed at the smart television 1102.

Figure 12:
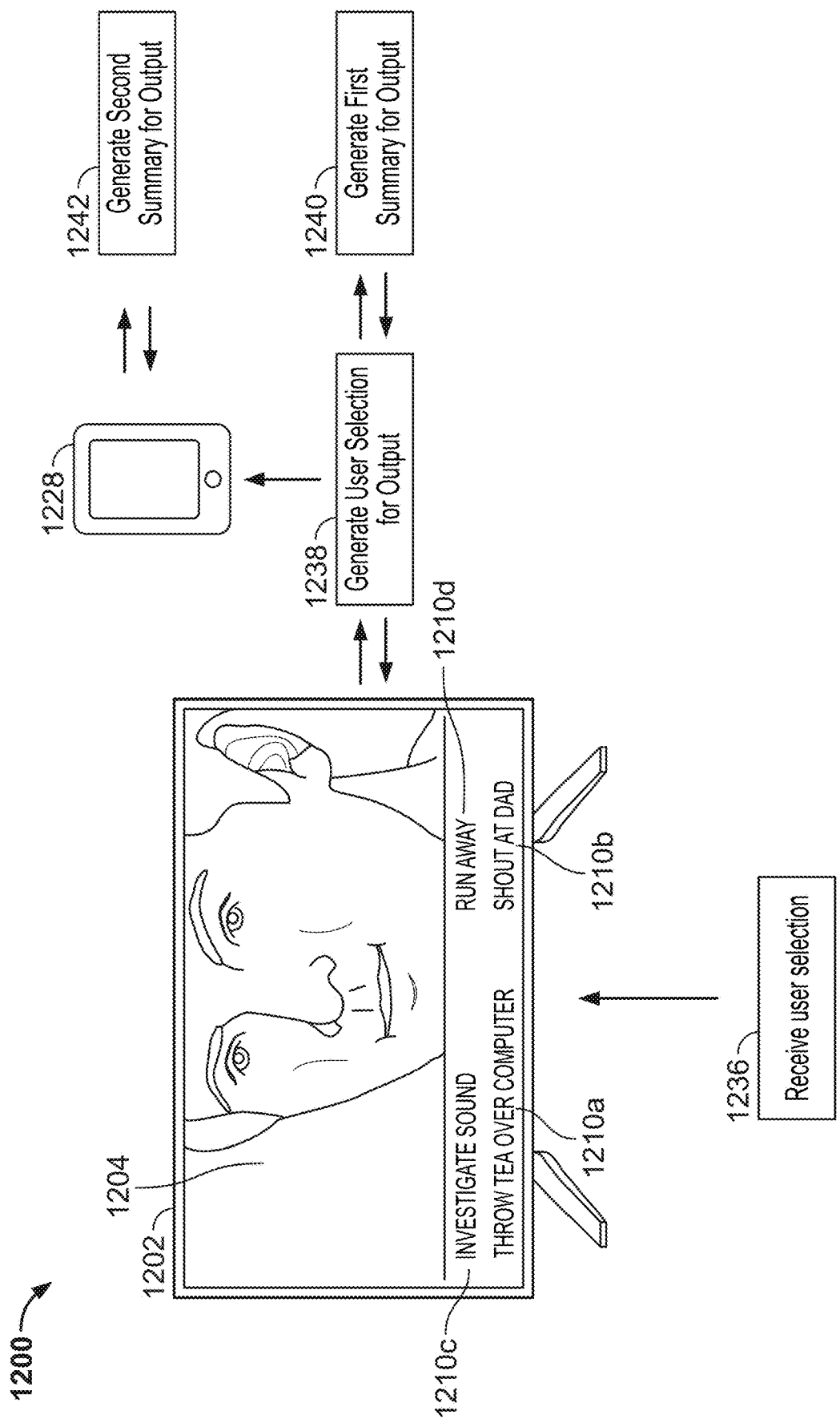
FIG. 12 shows another example environment in which an enhanced viewing experience for one or more users of an interactive media program is provided, in accordance with some embodiments of the disclosure.

FIG. 12 shows another example environment in which an enhanced viewing experience for one or more users of an interactive media program is provided, in accordance with some embodiments of the disclosure. In a similar manner to the environments shown in FIGS. 10A-C and 11A-B, the environment 1200 comprises a computing device, in this case a smart television 1102, that receives and displays an interactive media program 1204. The interactive media program may be received, via a network, such as the internet, from a server. At a choice point, options 1210*a*, 1210*b*, 1210*c* and 1210*d* are displayed on a display of the smart television 1202. Receiving user selections 1236 comprises receiving a first selection of an option and a second selection of an option. On receiving the first and second options, segments associated with the user selections are generated for output 1238. A segment associated with the first option is displayed on a display of the smart television 1202, and a segment associated with the second option is displayed on a display of a tablet 1228. Once the segments associated with the selected options have been displayed, a first summary of the segments that were not displayed at the smart television 1202 is generated for output 1240 and is displayed at the smart television 1202. A second summary of the options that were not displayed at the tablet 1228 is generated for output 1242 and is displayed at the tablet 1228. Once the first and second summaries have been displayed, a common segment of the interactive media program is displayed at the smart television 1202.

Figure 13:
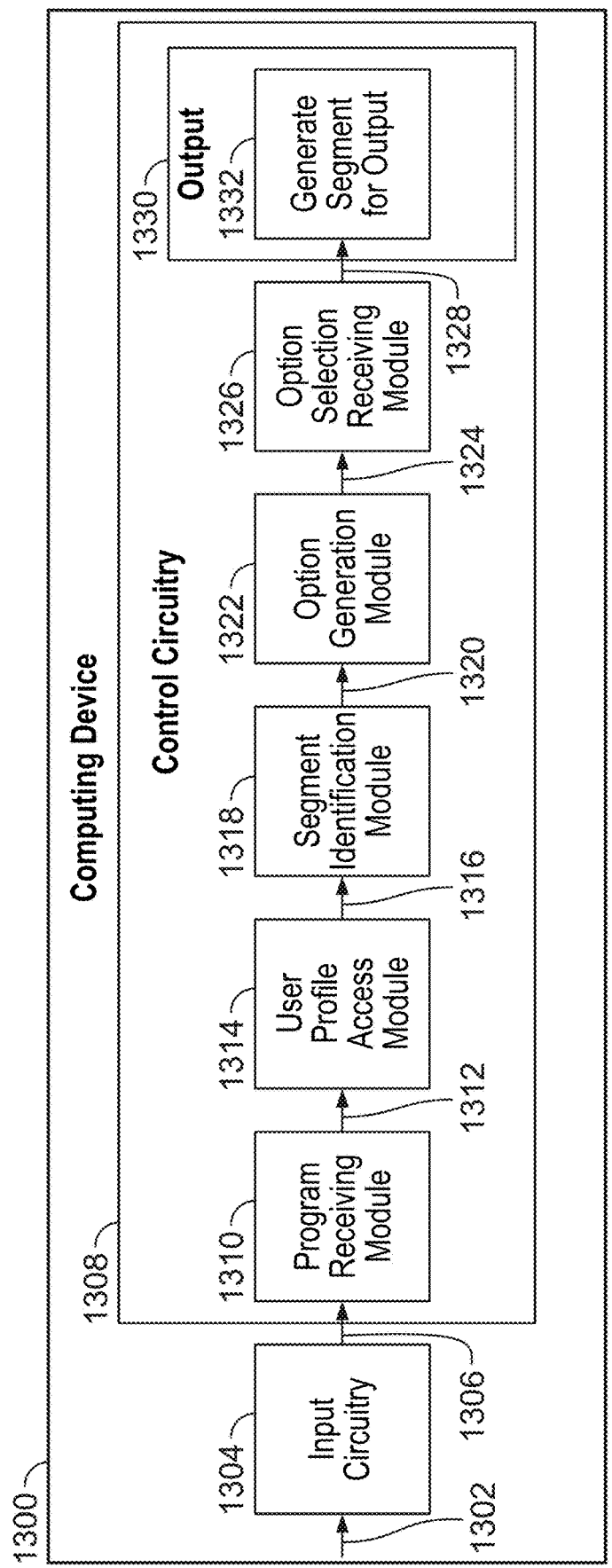
FIG. 13 shows a block diagram representing components of a computing device and data flow therebetween for determining a subset of available paths of an interactive media program to generate for display, in accordance with some embodiments of the disclosure.

FIG. 13 shows a block diagram representing components of a computing device and data flow therebetween for determining a subset of available paths of an interactive media program to generate for display, in accordance with some embodiments of the disclosure. Computing device 1300 (e.g., a smart television 402, 502, 602, 702, 802, 902) as discussed in connection with FIGS. 4-9) comprises input circuitry 1304, control circuitry 1308 and an output module 1330. Control circuitry 1308 may be based on any suitable processing circuitry (not shown) and comprises control circuits and memory circuits, which may be disposed on a single integrated circuit or may be discrete components and processing circuitry. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i9 processors) or multiple different processors (e.g., an Intel Core i5 processor and an Intel Core i7 processor) and/or a system on a chip (e.g., a Qualcomm Snapdragon 888). Some control circuits may be implemented in hardware, firmware, or software.

A user provides an input 1302 that is received by the input circuitry 1304. The input circuitry 1304 is configured to receive a user input related to a computing device. For example, this may be via a touchscreen, keyboard, mouse, microphone and/or infra-red controller of the computing device 1300. The input circuitry 1304 transmits 1306 the user input to the control circuitry 1308.

The control circuitry 1308 comprises a program receiving module 1310, a user profile access module 1314, a segment identification module 1318, an option generation module 1322, an option selection receiving module 1326 and an output module 1330. The user input is transmitted 1306 to the program receiving module 1310. At the program receiving module 1310, an interactive media program is received. On receiving the interactive media program, a request is transmitted 1312 to the user profile access module 1314 to access a user profile. On accessing the user profile, a request, and at least a part of the user profile, are transmitted 1316 to the segment identification module 1318 to identify a subset of the plurality of alternative segments of the interactive media program based on the user profile. On identifying a subset of the plurality of alternative segments, an indication of the identified subset of alternative segments is transmitted 1320 to the option generation module 1322. The option generation module 1322 generates a plurality of options for output based on the received indication of the identified subset of alternative segments. The plurality of options are transmitted 1324 to the option selection receiving module 1326, wherein the indication of an option to be selected is received. The option selection module 1326 transmits 1328 the selected option to the output module 1330 where a segment that is associated with the selected option is generated for output 1332.

Figure 14:
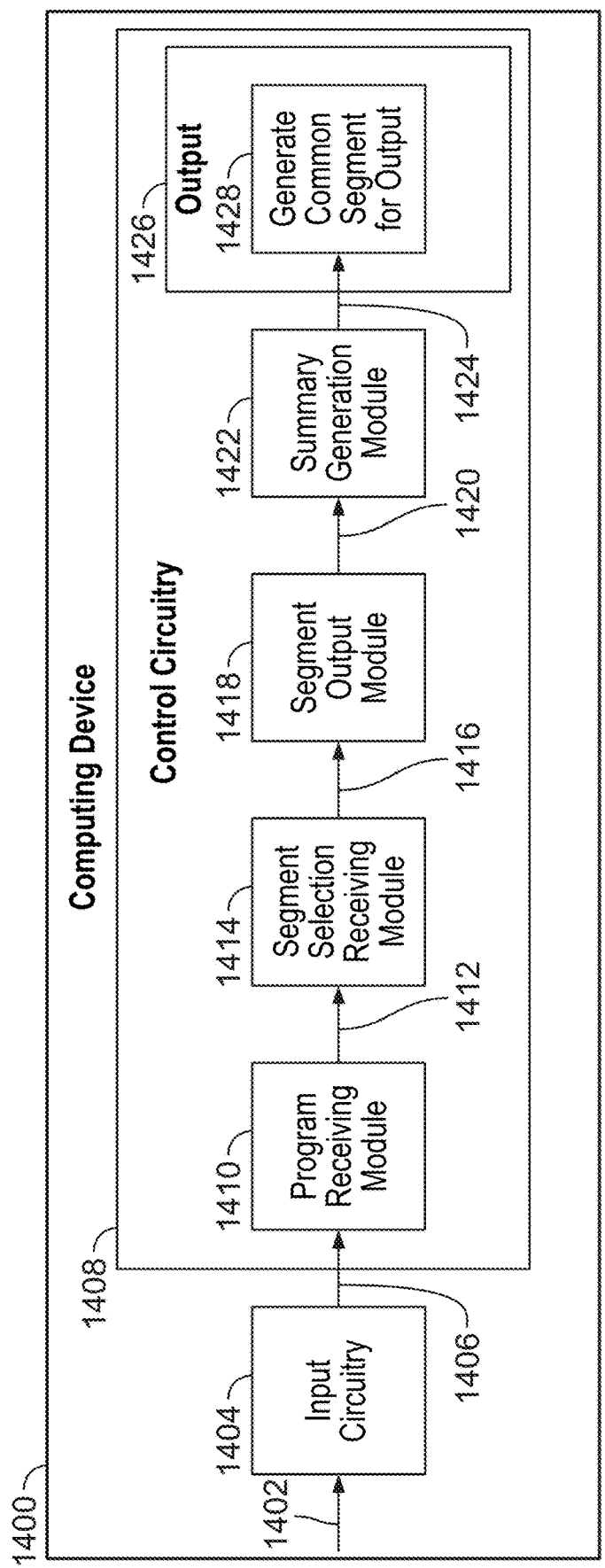
FIG. 14 shows a block diagram representing components of a computing device and data flow therebetween for providing an enhanced viewing experience for one or more users of an interactive media program, in accordance with some embodiments of the disclosure.

FIG. 14 shows another block diagram representing components of a computing device and data flow therebetween for determining a subset of available paths of an interactive media program to generate for display, in accordance with some embodiments of the disclosure. Computing device 1400 (e.g., a smart television 1002, 1102, 1202 as discussed in connection with FIGS. 10-12) comprises input circuitry 1404, control circuitry 1408 and an output module 1426. Control circuitry 1408 may be based on any suitable processing circuitry (not shown) and comprises control circuits and memory circuits, which may be disposed on a single integrated circuit or may be discrete components and processing circuitry. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i9 processors) or multiple different processors (e.g., an Intel Core i5 processor and an Intel Core i7 processor) and/or a system on a chip (e.g., a Qualcomm Snapdragon 888). Some control circuits may be implemented in hardware, firmware, or software.

A user provides an input 1402 that is received by the input circuitry 1404. The input circuitry 1404 is configured to receive a user input related to a computing device. For example, this may be via a touchscreen, keyboard, mouse, microphone and/or infra-red controller of the computing device 1400. The input circuitry 1404 transmits 1406 the user input to the control circuitry 1408.

The control circuitry 1408 comprises a program receiving module 1410, a segment selection receiving module 1414, a segment output module 1418, an summary generation module 1422 and an output module 1426. The user input is transmitted 1406 to the program receiving module 1410. At the program receiving module 1410, an interactive media program is received. On receiving the interactive media program, a plurality of options that correspond to each of the plurality of segments are generated and are transmitted 1412 to the segment selection receiving module 1414. At the segment selection receiving module 1414, the options are generated for output, and a selection of one of the options, corresponding to a segment of the plurality of alternative segments, is received. The selection is transmitted 1416 to the segment output module 1418, wherein the segment is generated for output. An indication of the segment associated with the selected option is transmitted 1420 to the summary generation module 1422, wherein a summary of the plurality of alternative segments is generated for output. An indication of when the summary has finished, or is about to finish, being output is transmitted to the output module 1426, where a common segment is generated for output 1428.

Figure 15:
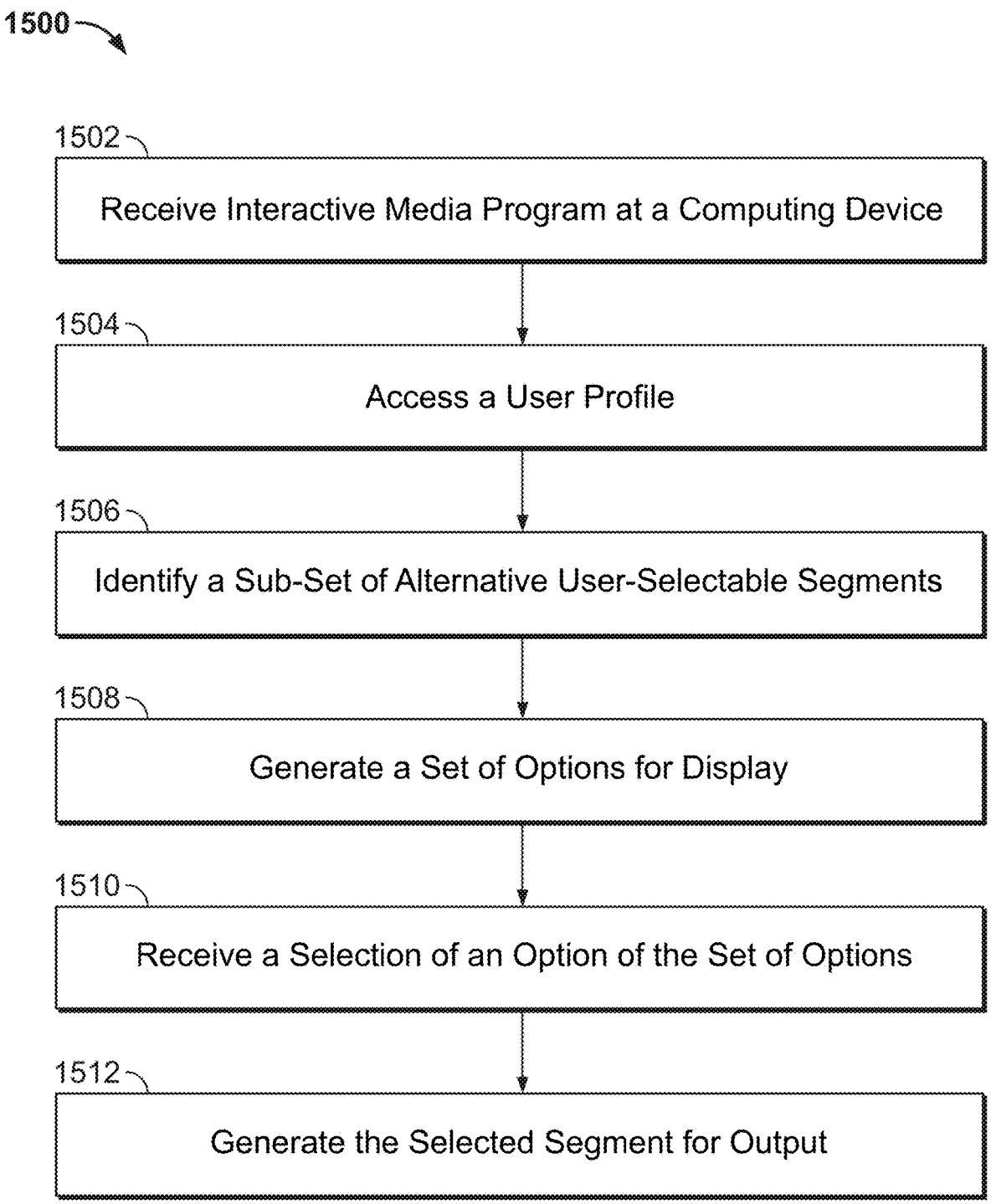
FIG. 15 shows a flowchart of illustrative steps involved for determining a subset of available paths of an interactive media program to generate for display, in accordance with some embodiments of the disclosure.

FIG. 15 shows a flowchart of illustrative steps involved for determining a subset of available paths of an interactive media program to generate for display, in accordance with some embodiments of the disclosure. Process 1500 may be implemented on any of the aforementioned computing devices (e.g., smart television 402, 502, 602, 702, 802, 902). In addition, one or more actions of the process 1500 may be incorporated into or combined with one or more actions of any other process or embodiments described herein.

At 1502, an interactive media program is received at a computing device. At 1504, a user profile is accessed. At 1506, a subset of alternative segments is identified. At 1508, a set of options is generated for display. At 1510, a selection of one of the options is received. At 1512, the selected segment is generated for output.

FIG. 16 shows a flowchart of illustrative steps involved for providing an enhanced viewing experience for one or more users of an interactive media program, in accordance with some embodiments of the disclosure. Process 1600 may be implemented on any of the aforementioned computing devices (e.g., smart television 1002, 1102, 1202). In addition, one or more actions of the process 1600 may be incorporated into or combined with one or more actions of any other process or embodiments described herein.

At 1602, an interactive media program is received at a computing device. At 1604, a selection of a first alternative segment is received. At 1606, a first alternative segment is generated for output. At 1608, a segment summary is generated. At 1610, a segment summary is generated for output. At 1612, a common segment is generated for output.

FIG. 17 shows another flowchart of illustrative steps involved for determining a subset of available paths of an interactive media program to generate for display, in accordance with some embodiments of the disclosure. Process 1700 may be implemented on any of the aforementioned computing devices (e.g., smart television 402, 502, 602, 702, 802, 902). In addition, one or more actions of the process 1700 may be incorporated into or combined with one or more actions of any other process or embodiments described herein.

At 1702, a user opens a streaming application, for example, an application associated with an OTT provider. At 1704, a user selects a user profile, for example, by selecting an icon displayed on a display of a smart television. At 1706, a user selects an interactive media program, for example, via an interface of an application associated with an OTT provider. At 1708, a first segment of the interactive media program is generated for output, for example, a first common segment of the interactive media program is displayed on a display of a smart television. At 1710, a subset of segments is identified, for example based on the selected user profile. At 1712, identification of the viewers takes place, for example via a camera associated with a smart television or via a computing device associated with a user. At 1714, it is identified whether there is more than one viewer. If there is only one viewer ("No" at 1714), at 1716, options associated with the subset of identified segments are generated for output. At 1718, a selection of one of the options is received, and at 1720, a segment associated with the selected option is generated for output 1720.

If there is more than one viewer ("Yes" at 1714), at 1722 it is identified whether a profile for the additional viewers are available. If they are available, at 1724, the additional profile(s) are accessed and options are generated for output based on the selected user profile, the identified subset of segments and the subsequently accessed user profiles. For example, the options may only be generated for output for some of the identified subset of segments based on the subsequently accessed user profiles. At 1726, it is identified whether additional computing devices are available. If additional computing devices are not available, at 1730, a selection of one of the options is received, and, at 1732, a segment associated with the selected option is generated for output.

If additional computing devices are available, then generating the options for output further comprises indicating, at 1728, that the segment(s) associated with the options may be viewed on an additional computing device. At 1734, a selection of the options is received, and, at 1736, segments associated with the selected options are generated for output on the selected computing devices.

The processes described above are intended to be illustrative and not limiting. One skilled in the art would appreciate that the steps of the processes discussed herein may be omitted, modified, combined, and/or rearranged, and any additional steps may be performed without departing from the scope of the disclosure. More generally, the above disclosure is meant to be example and not limiting. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for providing an enhanced viewing experience for one or more users of an interactive media program, the method comprising:

receiving, at a computing device, the interactive media program, wherein the interactive media program comprises a plurality of alternative segments followed by a common segment;
receiving a selection of a first alternative segment;
generating for output, the first alternative segment;
analyzing the plurality of alternative segments to identify, based on segment metadata, a characteristic common to a sub-set of the plurality of alternative segments
identifying, based on the characteristic, a plurality of related subsections from the plurality of unselected alternative segments;
generating a summary of the related subsections;
generating for output, the summary; and
generating for output the common segment of the interactive media program.

2. The method of claim 1, further comprising:
receiving a selection of a second alternative segment;
generating for output, the second alternative segment.

3. The method of claim 2, wherein generating the summary further comprises summarizing only the selected segments.

4. The method of claim 1, further comprising:
accessing a user profile;
determining, based on the user profile, an interest level in each of the unselected segments; and wherein:
generating the summary further comprises summarizing only the segments that have an associated interest level that is above a threshold value.

5. The method of claim 1, further comprising:
receiving an indication of a bookmark during the output of a segment; and wherein:
generating the summary further comprises summarizing only a sub-section of a segment as indicated by the bookmark.

6. The method of claim 1, wherein generating a summary further comprises indicating that one or more segments of the plurality of alternative segments be generated for output at an increased playback speed.

7. The method of claim 1, wherein generating a summary further comprises indicating a sub-section of a segment to be generated for output.

8. The method of claim 1, wherein the first segment is generated for output at a first computing device and wherein the second segment is generated for output at a second computing device; and wherein:
generating the summary further comprises generating a first summary based on the first segment and generating a second summary based on the second segment; and
generating the summary for output further comprises generating the first summary for output at the first computing device and generating the second summary for output at the second computing device.

9. The method of claim 1, further comprising accessing a user profile, and wherein generating a summary further comprises identifying a summary duration based, at least in part, on the accessed user profile.

10. A system for providing an enhanced viewing experience for one or more users of an interactive media program, the system comprising:
a communication port;
a memory storing instructions; and
control circuitry communicably coupled to the memory and the communication port and configured to execute the instructions to:
receive, at a computing device and via the communication port, the interactive media program, wherein the interactive media program comprises a plurality of alternative segments followed by a common segment;
receive a selection of a first alternative segment;
generate for output, the first alternative segment;
analyze the plurality of alternative segments to identify, based on segment metadata, a characteristic common to a sub-set of the plurality of alternative segments;
identify, based on the characteristic, a plurality of related subsections from the plurality of unselected alternative segments;
generate a summary of the related subsection;
generate for output, the summary; and
generate for output the common segment of the interactive media program.

11. The system of claim 10, wherein the control circuitry is further configured to:
receive a selection of a second alternative segment;
generate for output, the second alternative segment.

12. The system of claim 11, wherein the control circuitry configured to generate the summary is further configured to summarize only the selected segments.

13. The system of claim 10, wherein the control circuitry is further configured to:
access a user profile;
determine, based on the user profile, an interest level in each of the unselected segments; and wherein:
the control circuitry configured to generate the summary is further configured to summarize only the segments that have an associated interest level that is above a threshold value.

14. The system of claim 10, wherein the control circuitry is further configured to:
receive an indication of a bookmark during the output of a segment; and wherein:
the control circuitry configured to generate the summary is further configured to summarize only a sub-section of a segment as indicated by the bookmark.

15. The system of claim 10, wherein the control circuitry configured to generate a summary is further configured to indicate that one or more segments of the plurality of alternative segments be generated for output at an increased playback speed.

16. The system of claim 10, wherein the control circuitry configured to generate a summary is further configured to indicate a sub-section of a segment to be generated for output.

17. The system of claim 10, wherein the control circuitry is further configured to generate the first segment for output at a first computing device and to generate the second segment for output at a second computing device and wherein:
the control circuitry configured to generate the summary is further configured to generate a first summary based on the first segment and generate a second summary based on the second segment; and
the control circuitry configured to generate the summary for output is further configured to generate the first summary for output at the first computing device and generate the second summary for output at the second computing device.

18. The system of claim 10, wherein the control circuitry is further configured to access a user profile, and wherein:
the control circuitry configured to generate a summary is further configured to identify a summary duration based, at least in part, on the accessed user profile.

* * * * *